(12) United States Patent
Matsukawa et al.

(10) Patent No.: US 7,176,801 B2
(45) Date of Patent: Feb. 13, 2007

(54) ARTICLE MANAGEMENT SYSTEM AND METHOD

(75) Inventors: Yoshihiko Matsukawa, Nara (JP); Shusaku Okamoto, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/172,034

(22) Filed: Jun. 30, 2005

(65) Prior Publication Data

US 2005/0237196 A1 Oct. 27, 2005

Related U.S. Application Data

(63) Continuation of application No. PCT/JP05/00856, filed on Jan. 24, 2005.

(30) Foreign Application Priority Data

Jan. 27, 2004 (JP) .............................. 2004-018095

(51) Int. Cl.
G08B 13/14 (2006.01)
(52) U.S. Cl. ................. 340/572.5; 340/572.1; 340/539.32
(58) Field of Classification Search ............ 340/572.5, 340/539.32, 572.1
See application file for complete search history.

(56) References Cited

U.S. PATENT DOCUMENTS 6,331,817 B1* 12/2001 Goldberg .................. 340/573.1
6,433,685 B1* 8/2002 Struble et al. ............. 340/571
6,492,905 B2* 12/2002 Mathias et al. ............ 340/540
6,970,088 B2* 11/2005 Kovach ..................... 340/572.1
2002/0089423 A1* 7/2002 Przygoda, Jr. ............. 340/540

FOREIGN PATENT DOCUMENTS

| JP | 10-312485 | 11/1998 |
|---|---|---|
| JP | 2000-259717 A | 9/2000 |
| JP | 2001-236585 A | 8/2001 |
| JP | 2001-285842 | 10/2001 |
| JP | 2002-506258 A | 2/2002 |
| JP | 2002-522857 A | 7/2002 |
| JP | 2002-215848 A | 8/2002 |
| JP | 2002-216086 A | 8/2002 |
| JP | 2002-342892 | 11/2002 |
| JP | 2003-157477 A | 5/2003 |
| JP | 2003-175800 A | 6/2003 |
| JP | 2003-248900 A | 9/2003 |
| JP | 2003-346254 A | 12/2003 |
| JP | 2004-362439 A | 12/2004 |
| JP | 2005-128729 | 5/2005 |
| JP | 2005-182565 | 7/2005 |
| WO | 03/007261 A1 | 1/2003 |

* cited by examiner

*Primary Examiner*—Jeffery Hofsass
*Assistant Examiner*—Samuel J. Walk
(74) *Attorney, Agent, or Firm*—Harness, Dickey & Pierce, P.L.C.

(57) ABSTRACT

On a basis of information obtained by reading information for specifying articles carried by a user from identification tags attached to the articles by means of a sensor, a list of the articles carried by the user at the time point is formed. The list is stored every time the list is formed, and the event that the user has lost the article and the lost article are specified on the basis of two or more lists. Upon specifying the lost article, the user is notified of information concerning the lost article.

17 Claims, 21 Drawing Sheets

IDENTIFICATION TAG

| ARTICLE CODE | USER CODE | |
|---|---|---|
| | SERVICE PROVIDING ORGANIZATION CODE | USER ID |

Fig. 5A

FIRST BELONGINGS LIST

| USER CODE | U 1 2 3 4 ··· |
|---|---|
| POSITION | LATITUDE, LONGITUDE AND ALTITUDE OF FIRST SEARCHING DEVICE |
| TIME | 8:30 AM ON JULY 1, 2003 |
| BELONGING 1 | B 0 0 0 1 (WATCH) |
| BELONGING 2 | B 0 0 0 2 (PURSE) |
| ⋮ | ⋮ |
| BELONGING M | B 0 0 0 M (COAT) |
| END CODE | E O F |

Fig. 5B

SECOND BELONGINGS LIST

| USER CODE | U 1 2 3 4 ··· |
|---|---|
| POSITION | LATITUDE, LONGITUDE AND ALTITUDE OF SECOND SEARCHING DEVICE |
| TIME | 9:00 AM ON JULY 1, 2003 |
| BELONGING 1 | B 0 0 0 1 (WATCH) |
| BELONGING 2 | B 0 0 0 3 (UMBRELLA) |
| ⋮ | ⋮ |
| BELONGING (M-1) | B 0 0 0 M (COAT) |
| END CODE | E O F |

Fig. 7

LOST ARTICLE LIST

| USER CODE | U 1 2 3 4 ··· |
|---|---|
| POSITION | LATITUDE, LONGITUDE AND ALTITUDE OF FIRST SEARCHING DEVICE |
| TIME | 8:30 AM ON JULY 1, 2003 |
| POSITION | LATITUDE, LONGITUDE AND ALTITUDE OF SECOND SEARCHING DEVICE |
| TIME | 9:00 AM ON JULY 1, 2003 |
| LOST ARTICLE 1 | PURSE (B 0 0 0 2) |
| END CODE | E O F |

Fig. 8A

THIRD BELONGINGS LIST (THIEF)

| USER CODE | U 4 3 2 1 ··· |
|---|---|
| POSITION | LATITUDE, LONGITUDE AND ALTITUDE OF THIRD SEARCHING DEVICE |
| TIME | 8:40 AM ON JULY 1, 2003 |
| BELONGING 1 | B 1 0 0 1 (WATCH) |
| ⋮ | ⋮ |
| ⋮ | ⋮ |
| BELONGING M | B 1 0 0 M (PORTABLE TELEPHONE) |
| END CODE | E O F |

BELONGINGS OF THIEF (BELONGING 1 through BELONGING M)

Fig. 8B

FOURTH BELONGINGS LIST

| USER CODE | U 1 2 3 4 ···, U 4 3 2 1 ··· |
|---|---|
| POSITION | LATITUDE, LONGITUDE AND ALTITUDE OF THIRD SEARCHING DEVICE |
| TIME | 8:45 AM ON JULY 1, 2003 |
| BELONGING 1 | B 0 0 0 2 (PURSE) |
| BELONGING 2 | B 1 0 0 1 (WATCH) |
| ⋮ | ⋮ |
| BELONGING (M+1) | B 1 0 0 M (PORTABLE TELEPHONE) |
| END CODE | E O F |

STOLEN ARTICLE (BELONGING 1)

BELONGINGS OF THIEF (BELONGING 2 through BELONGING (M+1))

Fig. 10A

LOST ARTICLE LIST

| USER CODE | U 1 2 3 4 ··· |
|---|---|
| POSITION | LATITUDE, LONGITUDE AND ALTITUDE OF FIRST SEARCHING DEVICE |
| TIME | 8:30 AM ON JULY 1, 2003 |
| POSITION | LATITUDE, LONGITUDE AND ALTITUDE OF THIRD SEARCHING DEVICE |
| TIME | 8:43 AM ON JULY 1, 2003 |
| LOST ARTICLE 1 | WATCH (B 0 0 0 1) |
| LOST ARTICLE 2 | UMBRELLA (B 0 0 0 3) |
| ⋮ | ⋮ |
| LOST ARTICLE (M-1) | COAT (B 0 0 0 M) |
| END CODE | E O F |

Fig. 10B

LOST ARTICLE LIST (FIRST BELONGINGS LIST)

| USER CODE | U 1 2 3 4 ··· |
|---|---|
| POSITION | LATITUDE, LONGITUDE AND ALTITUDE OF FIRST SEARCHING DEVICE |
| TIME | 8:30 AM ON JULY 1, 2003 |
| POSITION | LATITUDE, LONGITUDE AND ALTITUDE OF THIRD SEARCHING DEVICE |
| TIME | 8:43 AM ON JULY 1, 2003 |
| LOST ARTICLE 1 | ★WATCH (B 0 0 0 1) |
| LOST ARTICLE 2 | PURSE (B 0 0 0 2) |
| LOST ARTICLE 3 | ★UMBRELLA (B 0 0 0 3) |
| ⋮ | ⋮ |
| LOST ARTICLE (M) | ★COAT (B 0 0 0 M) |
| END CODE | E O F |

Fig. 12

LOST ARTICLE LIST

| USER CODE | U 1 2 3 4 ··· |
|---|---|
| MEANS OF TRANSPORTATION | XY TAXI |
| TEL | 06-1234-56XX |
| NUMBER PLATE | NANIWA RU 57 1234 |
| ONBOARD POSITION | LATITUDE, LONGITUDE AND ALTITUDE OF GPS |
| TIME | 9:00 AM ON JULY 1, 2003 |
| LOST ARTICLE | PURSE (B 0 0 0 2) |
| END CODE | E O F |

*Fig. 14A*

IDENTIFICATION TAG

| ARTICLE INFORMATION | | | USER CODE |
|---|---|---|---|
| B0001 | R0002 | N0001 | |
| ARTICLE CODE | CONTACT ADDRESS CODE | COMMUNICATION CONTENT CODE | |

*Fig. 14B*

CONTACT ADDRESS CODE TABLE

| R0001 | ○×BANK | suport@marubatu.co.jp |
|---|---|---|
| R0002 | ABC CARD | suport@abc_card.co.jp |
| ⋮ | ⋮ | ⋮ |

*Fig. 14C*

COMMUNICATION CONTENT CODE TABLE

| N0001 | TEMPORARY SUSPENSION |
|---|---|
| N0002 | SUSPENSION |
| N0003 | SUSPENSION CANCEL |
| ⋮ | ⋮ |

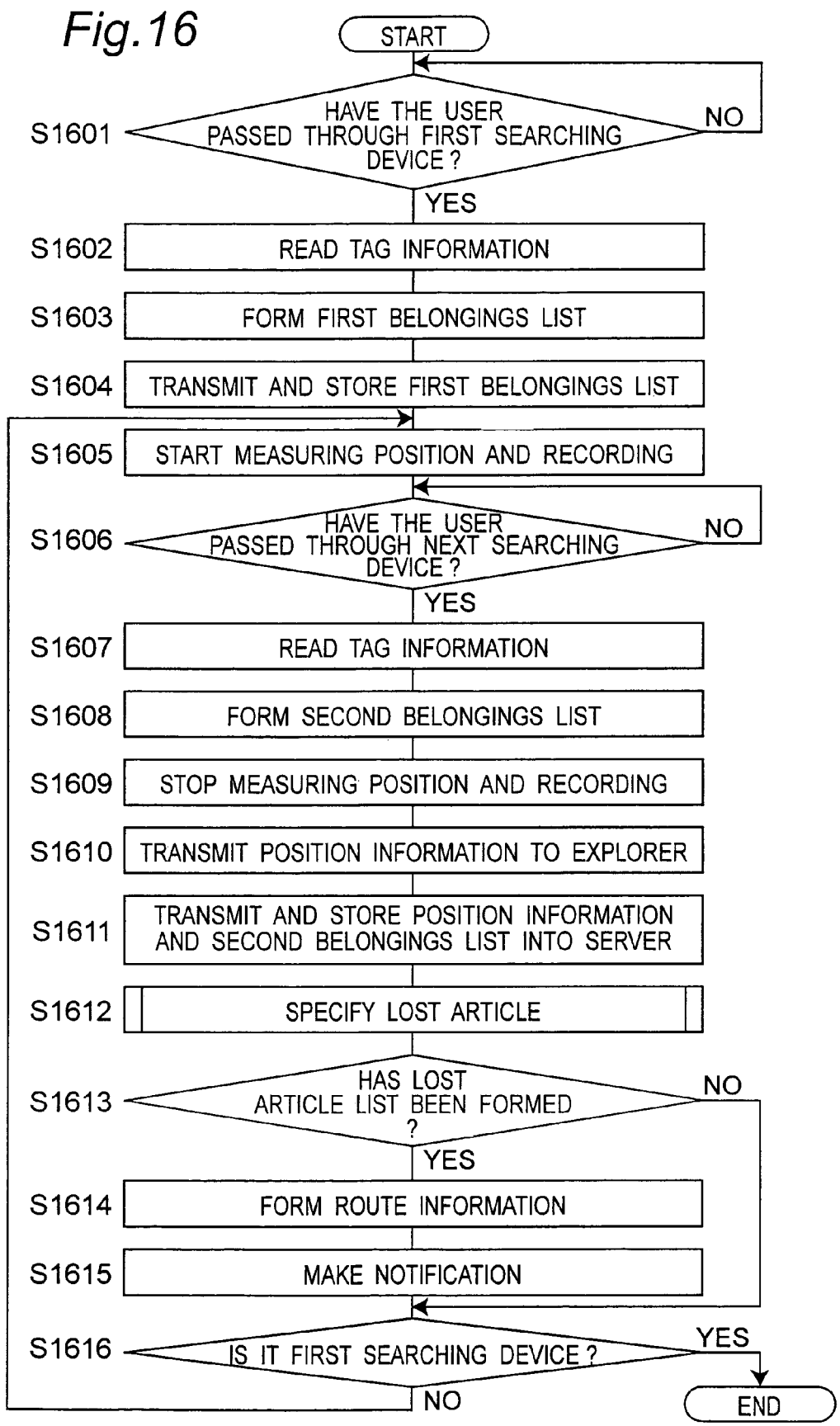

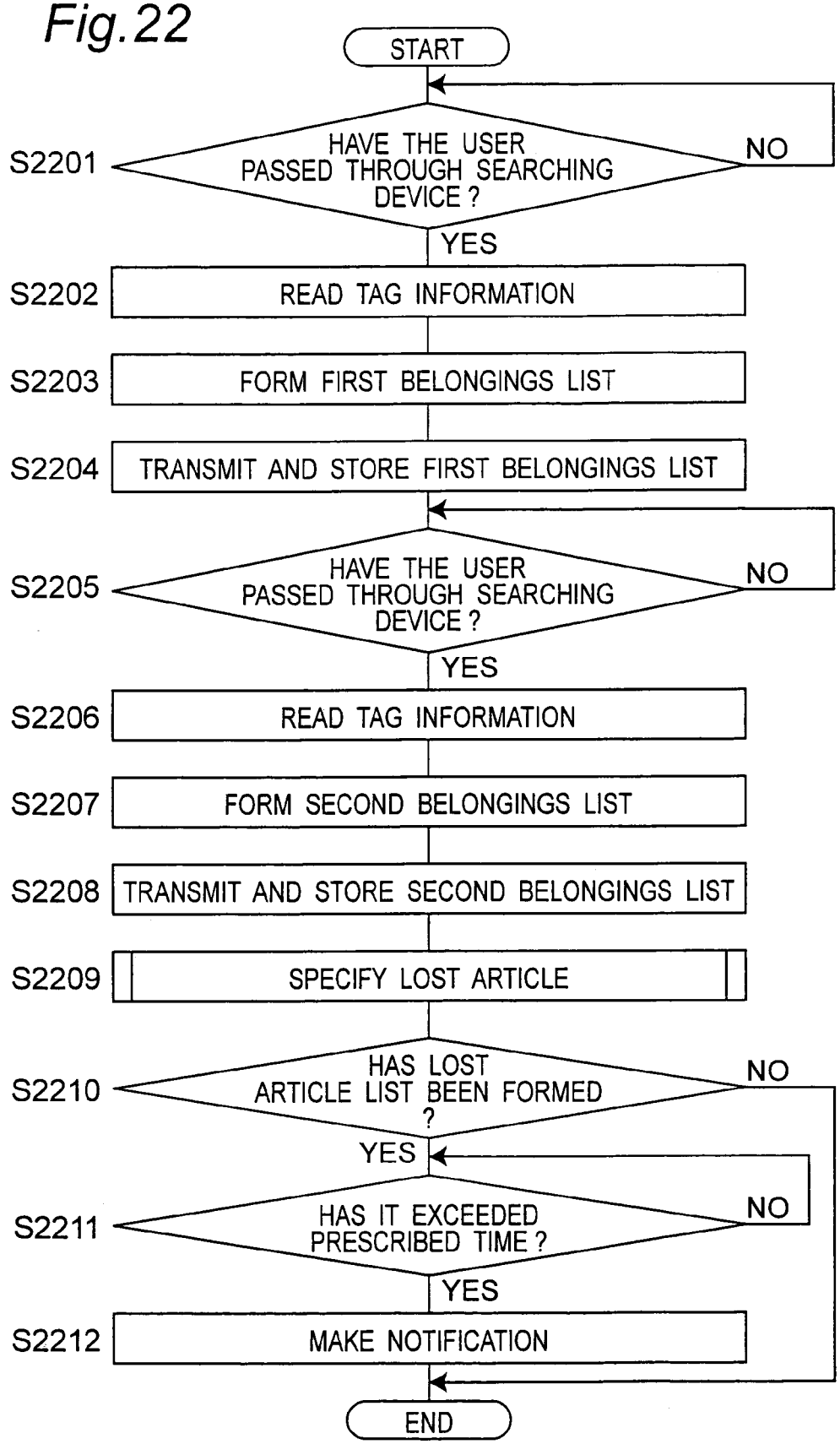

ARTICLE MANAGEMENT SYSTEM AND METHOD

TECHNICAL FIELD

The present invention relates to a system and method for managing articles and relates to, for example, an article management system and method for informing the user of the information of a lost article when the article is lost due to loss or theft.

BACKGROUND ART

Presently, attaching a noncontact tag of RFID (Radio Frequency Identification) or the like including the information that specifies an article to the article in place of the barcode that has been fixed to the article mainly for uses in physical distribution, supply chain management (SCM), and so on has come into reality.

It is not difficult to imagine that the attaching of a tag capable of reading the attribute of the article to each individual article in such a noncontact manner can be developed into a variety of uses besides the physical distribution use.

For example, a patent document 1 (JP 2002-215848 A) discloses a system for searching for a lost article by utilizing the tag attached to the article. The system includes an investigation server provided for each specified area in a town, and each investigation server is made to control a searching device that reads the information of the tag attached to an article. Then, upon noticing the loss of a belonging, the user transmits the information of the name of the article to be retrieved (lost article name) and the retrieval area to a retrieval system server, and the retrieval system server makes the investigation server of a designated retrieval area execute retrieval. That is, each of the searching devices managed by the investigation server execute the read of the tag information. By so doing, it is discovered that the lost article exists when the information of the article to be retrieved is read by any one of the searching devices, and therefore, the retrieval result is transmitted to the user.

The system is able to largely reduce the time for searching for the lost article even when the article has been lost in a town and also specify the place where the article has been lost (the place where the lost article exists) to a certain extent of accuracy.

DISCLOSURE OF INVENTION

Subject to be Solved by the Invention

The system disclosed in the patent document, which is a system for searching for the article existing in the town as a consequence of being dropped or left behind, is not able to find the lost article when an unretrievable area exists. Therefore, it is necessary to install searching devices all over the town in order to search for the lost article, whereas it is not realistic.

Moreover, the system does not search for the lost article unless the user notices the loss of the article. Therefore, when the lost article is, for example, a credit card or the like, the article might be maliciously used by another person before the user notices the loss of the article, possibly resulting in the damage of the user.

The present invention has been made in view of the above and has an object to provide an article management system and method, which are a system and method of comparatively simple constructions for specifying an event that the user has lost an article and notifying the user of the event.

Means for Solving the Subject

In accomplishing these and other objects, the present invention is constructed as follows.

According to a first aspect of the present invention, there is provided an article management system comprising:

a list forming means for forming a list of an article carried by a user on a basis of information obtained by reading information that specifies the article by means of a sensor from an identification tag attached to the article;

a storage means for storing the list every time the list is formed by the list forming means;

a lost article specifying means for specifying an event that the user has lost the article and the lost article on a basis of two or more lists stored in the storage means; and notification means for giving notification of information concerning the lost article upon receiving an event that the lost article is specified by the lost article specifying means.

According to the construction, the article management system of the present invention is not the system that searches for the lost article but the system that specifies the event that the user has lost the article. Therefore, the sensor that reads the information of the identification tag is not required to be installed all over a town but required to be installed in a specified position through which the user passes. It is appropriate to install the sensor at the doorway or the like through which the user goes in and out. Therefore, the construction of the whole system including the article management system of the present invention is simplified.

Moreover, when the lost article is specified by the lost article specifying means, the information of the lost article is notified to the user. This therefore eliminates the possibility of the occurrence of a situation in which the user does not perceive the event that the user's belonging has been lost for a long time.

According to a ninth aspect of the present invention, there is provided an article management system comprising:

a list forming means for forming a list of an article carried by a user on a basis of information obtained by reading information concerning an owner of the article by means of a sensor from an identification tag attached to the article;

a person identifying means for determining whether or not the user is a rightful owner of the article carried by the user on a basis of the list formed by the list forming means; and a notification means for notifying the owner of the article of information concerning the article upon determining that the user is not the rightful owner of the article by the person identifying means.

The system is the system that is effective particularly when the article is lost by theft. That is, when the identification tags of the articles carried by the user are read by the sensor as described above and the list of the articles carried by the user is formed, the person identifying means determines whether the user is the rightful owner of the articles carried by the user on the basis of the list. When it is determined that the user is not the rightful owner of the article carried by the user, the user is presumed to be the person who has stolen the article from the rightful owner or the person who has picked up the article that has been dropped or left behind. In any case, the rightful owner of the article has lost the article.

When it is determined that the user is not the rightful owner of the article carried by the user, the notification means notifies the owner of the article of the information concerning the article by, for example, a prescribed notification method.

As described above, the article management system of the present invention is also not the system that searches for the lost article but the system that specifies the event that the user has lost the article. Therefore, the sensor that reads the information of the identification tag is not required to be installed all over the town but required to be installed in the specified position through which the user passes. Therefore, the system construction is simplified.

Moreover, when the person identifying means determines that the user is not the rightful owner of the article, the information concerning the article is notified to the owner of the article. This therefore eliminates the possibility of the occurrence of a situation in which the user does not perceive the event that the user's belonging has been lost (e.g., stolen), for a long time.

According to a 13th aspect of the present invention, there is provided an article management method comprising:

reading information that specifies each of articles carried by a user from identification tags attached to the articles;

forming a list of the articles carried by the user at a time point on a basis of the read information;

storing the list every time the list is formed;

specifying an event that the user has lost an article and the lost article on a basis of the stored list; and notifying the user of information of the lost article when the lost article is specified.

According to a 14th aspect of the present invention, there is provided an article management method comprising:

reading information concerning an owner of each of articles carried by a user from identification tags attached to the articles;

forming a list of the articles carried by the user at a time point on a basis of the read information;

determining whether or not the user is a rightful owner of the articles carried by the user on a basis of the formed list; and notifying the owner of the articles of information of the articles when it is determined that the user is not the rightful owner of the articles in person identification.

According to a 15th aspect of the present invention, there is provided an article management program for making a computer produce:

a function to form a list of articles carried by a user at a time point on a basis of information obtained by reading information concerning an owner of each of the articles from identification tags attached to the articles carried by the user;

a function to determine whether or not the user is a rightful owner of the articles carried by the user on a basis of the formed list; and a function to notify the owner of the articles of information concerning the articles when it is determined that the user is not the rightful owner of the articles in person identification.

EFFECTS OF the INVENTION

As described above, according to the article management system of the present invention, the sensor is not required to be installed all over the town but required to be installed in the specified position through which the user passes, and the system construction can be simplified.

Moreover, the possibility of the occurrence of a situation in which the user does not perceive the event that the user's belonging has been lost or stolen for a long time can be eliminated.

BRIEF DESCRIPTION OF DRAWINGS

These and other aspects and features of the present invention will become clear from the following description taken in conjunction with the preferred embodiments thereof with reference to the accompanying drawings, in which:

FIG. 5A is a diagram showing one example of a belongings list;

FIG. 5B is a diagram showing one example of a belongings list;

FIG. 7 is a diagram showing one example of a lost article list;

FIG. 8A is a diagram showing another example of a belongings list;

FIG. 8B is a diagram showing another example of a belongings list;

FIG. 10A is a diagram showing another example of a lost article list;

FIG. 10B is a diagram showing another example of a lost article list;

FIG. 12 is a diagram showing another example of a lost article list;

FIG. 14A is a diagram showing one example of information stored in an identification tag;

FIG. 14B is a diagram showing one example of a contact address code table;

FIG. 14C is a diagram showing one example of a communication content code table;

FIG. 16 is a flowchart for explaining the operation of an article management system of the fourth embodiment;

FIG. 22 is a flowchart showing operation when an article is deposited in a place with a time limit according to a modification example of the second embodiment.

BEST MODE FOR CARRYING OUT THE INVENTION

Figures 1, 2:
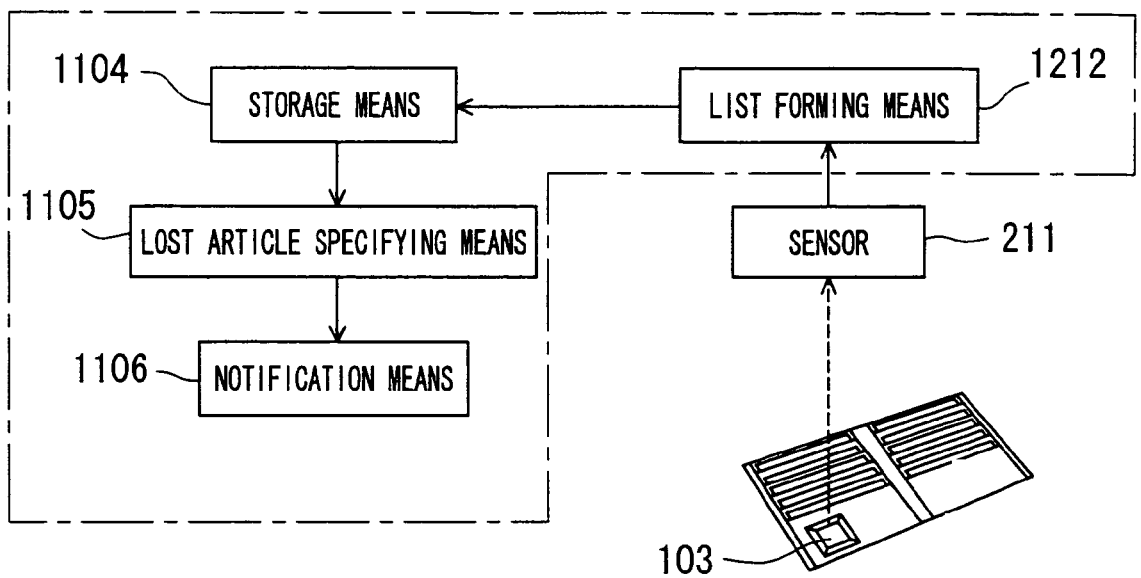
FIG. 1 is a diagram of the basic schematic constitution of an article management system according to first through fifth embodiments of the present invention.
FIG. 2 is an explanatory diagram of information stored in an identification tag.

Before the description of the present invention proceeds, it is to be noted that like parts are designated by like reference numerals throughout the accompanying drawings.

Before describing in detail the first embodiment of the present invention with reference to the drawings, reference is made to various modes of the present invention.

According to a first aspect of the present invention, there is provided an article management system comprising:

a list forming means for forming a list of an article carried by a user on a basis of information obtained by reading information that specifies the article by means of a sensor from an identification tag attached to the article;

a storage means for storing the list every time the list is formed by the list forming means;

a lost article specifying means for specifying an event that the user has lost the article and the lost article on a basis of two or more lists stored in the storage means; and notification means for giving notification of information concerning the lost article upon receiving an event that the lost article is specified by the lost article specifying means.

In the construction, the lost article specifying means specifies an event that the user has lost an article and specifies the lost article on the basis of two or more lists stored in the storage means. That is, when the sensor (either an identical sensor or different sensors are acceptable) reads information at least two times and then two or more lists are formed, the lost article specifying means specifies the event that the user has lost the article and the lost article.

Then, upon receiving the event that the lost article has been specified by the lost article specifying means, the notification means notifies the user of the information concerning the lost article by a prescribed notification method.

According to a second aspect of the present invention, there is provided The article management system as claimed in the first aspect, wherein the article list formed by the list forming means includes article information peculiar to each of a plurality of articles, and the lost article specifying means, when comparing the two or more lists stored in the storage means with each other, compares the article information peculiar to the articles with each other to specify the event that the user has lost the article and the lost article.

According to a third aspect of the present invention, there is provided the article management system as claimed in the first aspect, wherein the lost article specifying means functions to extract lists of articles including each article in the list formed at a specified time point and being formed immediately precedent to the specified time point, to specify an article group comprised of a union of all articles included in the extracted lists, and when an article other than the articles included in the list formed at the specified time point is included in the specified article group, to specify the article as the article that the user has lost.

According to a fourth aspect of the present invention, there is provided the article management system as claimed in the first aspect, further comprising a route specifying means for specifying a route through which the user has traveled, wherein the notification means notifies the user of the travel route of the user specified by the route specifying means together with information of the lost article.

According to a fifth aspect of the present invention, there is provided the article management system as claimed in the first aspect, further comprising:

a mobile search means for searching for the article to which the identification tag is attached by moving with a moving object in an environment; and a search request means for requesting the mobile search means to search for the lost article upon receiving an event that the lost article has been specified by the lost article specifying means.

According to a sixth aspect of the present invention, there is provided the article management system as claimed in the fifth aspect, wherein the notification means notifies the user of a search result upon receiving the search result of the mobile search means.

According to a seventh aspect of the present invention, there is provided the article management system as claimed in the fourth aspect, further comprising:

a mobile search means for searching for the article to which the identification tag is attached by moving with a moving object in an environment; and a search request means for requesting the mobile search means to search for the lost article upon receiving an event that the lost article has been specified by the lost article specifying means, wherein the search request means offers information of the travel route specified by the route specifying means to the mobile search means when making a request for searching for the lost article.

According to an eighth aspect of the present invention, there is provided the article management system as claimed in the seventh aspect, wherein the mobile search means executes search for the lost article in neighborhood of the travel route offered from the search request means, and the notification means notifies the user of a search result upon receiving the search result of the mobile search means.

According to a ninth aspect of the present invention, there is provided an article management system comprising:

a list forming means for forming a list of an article carried by a user on a basis of information obtained by reading information concerning an owner of the article by means of a sensor from an identification tag attached to the article;

a person identifying means for determining whether or not the user is a rightful owner of the article carried by the user on a basis of the list formed by the list forming means; and a notification means for notifying the owner of the article of information concerning the article upon determining that the user is not the rightful owner of the article by the person identifying means.

According to a tenth aspect of the present invention, there is provided the article management system as claimed in the ninth aspect, wherein one of the articles carried by the user is set as a hard-to-loose article, the identification tag attached to each of the articles carried by the user includes information of the hard-to-loose article, and the person identifying means determines that the user is the rightful owner of the article when the hard-to-loose article associated with the article included in the list is included in the list and determines that the user is not the rightful owner of the article when the hard-to-loose article associated with the article is not included in the list on a basis of the information of the identification tag.

According to a 11th aspect of the present invention, there is provided the article management system as claimed in the ninth aspect, further comprising a tracking means for tracking an article upon determining that the user is not the rightful owner of the article by the person identifying means, wherein the tracking means tracks the article by investigating whether or not the article is included in the list formed about a target user to be tracked, and the notification means notifies the owner of the article of a tracking result of the tracking means.

According to a 12th aspect of the present invention, there is provided the article management system as claimed in the first aspect or the ninth aspect, wherein the identification tag attached to the article includes contact address information of a facility related to the article, and the notification means notifies the facility related to the article of information of the article on a basis of information of the identification tag.

According to a 13th aspect of the present invention, there is provided an article management method comprising:

reading information that specifies each of articles carried by a user from identification tags attached to the articles;

forming a list of the articles carried by the user at a time point on a basis of the read information;

storing the list every time the list is formed;

specifying an event that the user has lost an article and the lost article on a basis of the stored list; and notifying the user of information of the lost article when the lost article is specified.

According to a 14th aspect of the present invention, there is provided an article management method comprising:

reading information concerning an owner of each of articles carried by a user from identification tags attached to the articles;

forming a list of the articles carried by the user at a time point on a basis of the read information;

determining whether or not the user is a rightful owner of the articles carried by the user on a basis of the formed list; and notifying the owner of the articles of information of the articles when it is determined that the user is not the rightful owner of the articles in person identification.

According to a 15th aspect of the present invention, there is provided an article management program for making a computer produce:

a function to form a list of articles carried by a user at a time point on a basis of information obtained by reading information concerning an owner of each of the articles from identification tags attached to the articles carried by the user;

a function to determine whether or not the user is a rightful owner of the articles carried by the user on a basis of the formed list; and a function to notify the owner of the articles of information concerning the articles when it is determined that the user is not the rightful owner of the articles in person identification.

The embodiments of the present invention will be described in detail below on the basis of the drawings.

Basic Constructions of First Through Fifth Embodiments

FIG. 1 is a block diagram showing the basic constructions of the article management systems of the first through fifth embodiments described later.

The article management system is a system in which, when a user 91 has lost a belonging 90a in a town due to loss, theft or the like, a service for providing the user 91 with the information of the loss and the information concerning the lost belonging 90a is offered.

The system includes a list forming means 1212 for forming a belongings list of the user 91 (information in a list form) on the basis of the information of the identification tag attached to the article read by a sensor 211, a storage means 1104 for storing the list formed by the list forming means 1212, a lost article specifying means 1105 for specifying the article that has been lost (lost article) 90a on the basis of two or more lists stored in the storage means 1104, and a notification means 1106 for notifying the user of the information concerning the lost article 90a when the lost article 90a is specified by the lost article specifying means 1105.

In the present system, an identification tag 103 is attached to each of the articles (belongings) carried by the user 91. The identification tag 103 is preferably attached particularly to each article that causes a trouble when the article is lost. For example, terminals including portable telephones, PDA's, notebook type personal computers, and so on, purses, credit cards, cash cards, commutation tickets, identification cards, clothes, umbrellas, watches, accessories, and so on can be enumerated as the articles to which the identification tags are preferably attached.

The identification tag 103 is preferably a noncontact tag and provided by, for example, an electronic tag (RFID) etc. Besides it, the identification tag 103 may be an object that can be detected by ultrasonic waves, light, or the like. Moreover, the tag itself may have a power source or a self-power generating function. Further, it is also possible to adopt, for example, a wireless LAN (Local Area Network) or systems similar to it as a usable device.

When the identification tag 103 is provided by an electronic tag and the identification tag 103 is rewritable (or recordable), it is possible to utilize the electronic tag utilized for use in, for example, physical distribution as the identification tag 103 of the present system. That is, the user additionally records the user information and so on of the owner when the article is obtained, in addition to the article information (information peculiar to the article, recorded by the manufacturer, similarly to the conventional barcode) originally recorded in the electronic tag by means of a tag writer. By so doing, the electronic tag can be utilized as the identification tag 103 of the present system. Moreover, the identification tag 103 may associate the article information with the user information by means of a server.

FIG. 2 shows one example of the data structure recorded in the identification tag 103. In the identification tag 103, an article code is recorded as article information, and a user code is recorded as user information.

The article code is a number assigned peculiar to the article by the manufacturer and constituted of, for example, a combination of a manufacturer code, a product code and so on. With this arrangement, the product information of the manufacturer, the date of manufacture, the product name (trade name), the use-by date when the article is a food, and the like, can be obtained from the article code.

The user code is constituted of a user ID etc. assigned to the user at the start of service from the service providing organization of the service provided for the user by utilizing the present system. In this case, it is possible that a plurality of service providing organizations provide similar services, and therefore, a code formed by combining the code of the service providing organization with the user ID (e.g., it is acceptable to merely arrange the two codes) can be used as the user code.

The above construction is the construction common to not only the first embodiment but also the other embodiments, and the constructions and effects peculiar to the individual embodiments are described below.

First Embodiment

Reference is next made to the article management system of the first embodiment in accordance with a concrete use scene.

(First Use Scene)

Figure 3:
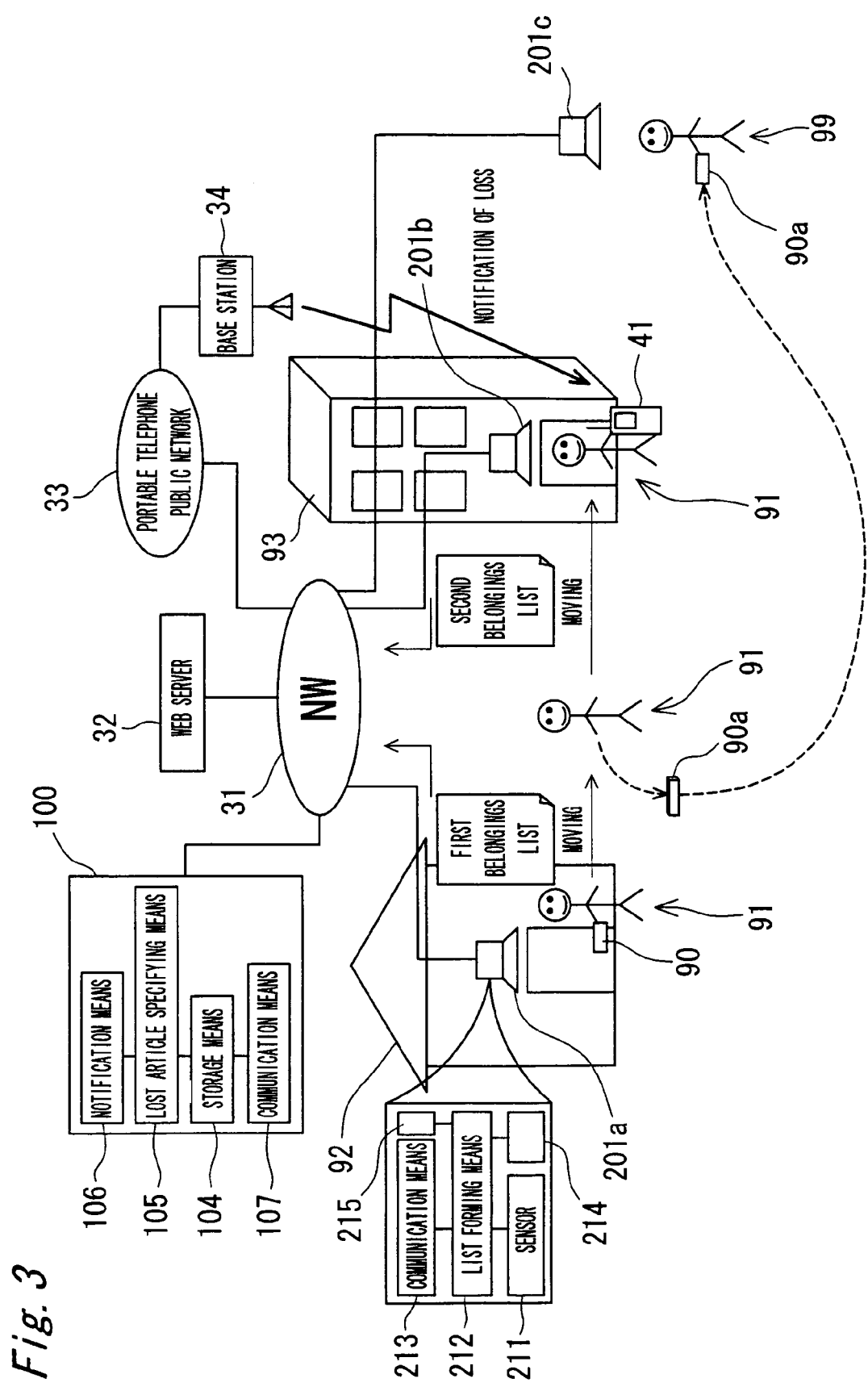
FIG. 3 is a block diagram of the article management system of the first embodiment.

The first use scene is a scene in which the user 91 has left behind (or dropped) a belonging 90 somewhere while walking in a town. FIG. 3 shows a constituent view of the present system corresponding to the first use scene.

The system includes a server 100, and at least one searching device 201 (although two of the first and second searching devices 201*a* and 201*b* are provided in the example of FIG. 3, three or more searching devices may be provided) existing in the environment of action of the user 91. Both of them, i.e., the server 100 and the searching devices 201 are connected to each other via a network 31.

The network 31 can be provided by the Internet that is a general communication line.

The searching device 201 is installed at the doorway of a building or the like. In this case, the first searching device 201*a* is installed at the entrance of a home 92 of the user 91, and the second searching device 201*b* is installed at the doorway of a building, a store, or the like 93.

The searching device 201 (201*a*, 201*b*) includes a sensor 211 that can read the information of the identification tag attached to each article, a timing part 214 that measures the time when the information of the identification tag 103 is read by means of the sensor 211, a position measurement part 215 that measures the position (e.g., a combination of latitude, longitude, and altitude) where the information of the identification tag 103 is read by means of the sensor 211, a list forming means 212 (corresponding to the list forming means 1212 of FIG. 1) that is connected to the timing part 214, the position measurement part 215, and the sensor 211, for forming a belongings list of the user 91 on the basis of the information of the identification tag attached to the article read by the sensor 211, and a communication means 213 that is connected to the list forming means 212 and is connectable to the server 100 via the network 31.

As described above, the sensor 211 reads the information of the identification tag 103 attached to the article. The sensor 211 has its construction determined according to the construction of the identification tag 103. When the identification tag 103 is an electronic tag, the sensor 211 becomes a tag reader corresponding to the electronic tag. Moreover, when the identification tag 103 has a power source or a self-power generating function, it is proper to constitute the sensor 211 so as to receive the information transmitted from the tag 103. If a sensor network (including interconnect lines for connecting the sensors 211 to the network) is prepared as an infrastructure, the sensor network may be utilized even though the sensors 211 are not provided by the service providing organization of the service utilizing the present system. In this case, the list forming means 212 and the sensor 211 may be separately provided instead of being provided in one apparatus.

When the user, who carries an article to which the identification tag 103 is attached, passes by the sensor 211, the list forming means 212 forms a list of the belongings of the user 91 on the basis of the information read by the sensor 211.

The communication means 213 is a general communication means for transmitting and receiving the information via the network 31, and the present system transmits particularly the belongings list formed by the list forming means 212 to the server 100 via the network 31.

Each searching device 201 is equipped with a timing function of the timing part 214 and a position measuring function of the position measurement part 215, and the time when the information of the identification tag 103 is read and the position (e.g., a combination of latitude, longitude, and altitude) where the information thereof is read can be obtained by the functions. The obtained information is put in the information of the belongings list formed by the list forming means 212.

The position measuring function can utilize, for example, the GPS (Global Positioning System) (this is useful when the searching device 201 itself moves as described later). As in the system shown in FIG. 3, when each searching device 201 is installed stationarily in a specified place, it is proper to store the position information of the installation place into the searching device 201 when the searching device 201 is installed and include the position information in the information of the belongings list formed by the list forming means 212.

Each searching device 201 can be constructed by connecting the sensor 211 to a general computer system that has a communication function. The list forming means 212 can execute the processing described later by being stored as a computer program into a storage device (hard disk or the like) and executing the computer program by means of a CPU by reading the computer program into a temporary storage device (semiconductor memory or the like). That is, the program can be, for example, an article management program for making the computer achieve a function to form a list of the articles carried by the user at the time point on the basis of the information obtained by reading the information concerning the owner of the articles from the identification tags attached to the articles, a function to determine whether or not the user is the rightful owner of the articles carried by the user on the basis of the formed list, and a function to notify the owner of the articles of the information concerning the articles when it is determined that the user is not the rightful owner of the articles at the time of identifying the user himself or herself.

The server 100 includes a communication means 107 connectable to the network 31, a storage means 104 (corresponding to the storage means 1104 of FIG. 1) connected to the communication means 107, a lost article specifying means 105 (corresponding to the lost article specifying means 1105 of FIG. 1) connected to the storage means 104, and a notification means 106 (corresponding to the notification means 1106 of FIG. 1) connected to the lost article specifying means 105.

It is proper to provide the communication means 107 by a general communication means for transmitting and receiving the information via the network 31.

The storage means 104 stores the belongings list that has been obtained via the network 31 and the communication means 107 and formed by the list forming means 212 of each searching device 201.

The lost article specifying means 105 specifies an event that the user 91 has lost the article 90 and the lost article 90*a* on the basis of two or more lists stored in the storage means 104, and this will be described in detail later.

Upon specifying the lost article 90*a* by the lost article specifying means 105, the notification means 106 notifies the user 91 of the occurrence of the lost article 90*a* by a prescribed method described later.

The server 100 can be constructed on the basis of a general computer system that has a communication function. Each means of the notification means 106 and the lost article specifying means 105 can execute the processing described later by being stored as a computer program into a storage device (hard disk or the like) and executing the program by means of a CPU by reading the computer program into a temporary storage device (semiconductor memory or the like).

It is acceptable to make each searching device 201 have the lost article specifying means 105 and the notification means 106 loaded on the server 100 and then construct the present system so as to operate by one or more searching devices 201 in an autonomous distributed manner.

Moreover, in the present system, a Web server 32 is connected to the network 31, and the Web server 32 is utilized in giving notification to the portable telephone or the like of the user 91 by the notification means 106 as described later.

Further, in the present system, a base station 34 is connected to the network 31 via a portable telephone public network 33, and the portable telephone public network 33 and the base station 34 are utilized in giving notification to the portable telephone or the like of the user 91 by the notification means 106 as described later.

Moreover, the user 91 has a communication terminal of a portable telephone 41 or the like to receive notification from the notification means 106.

Hereinafter, the operation (article management processing) of the article management system is described in accordance with the first use scene with reference to the flowchart shown in FIG. 4.

(Step S401)

It is determined whether or not the user 91 has passed by the first searching device 201*a* installed at the entrance of the home 92. The step S401 is repeated when the user 91 has not passed, or the program flow proceeds to step S402 when the user 91 has passed. That is, the processing of the article management system proceeds to step S402 when the user 91 goes out of the home 92.

(Steps S402, 403 and 404)

The information of the identification tag 103 attached to each article carried by the user 91 is read by the sensor 211 of the first searching device 201*a* (step S402), and the list forming means 212 of the first searching device 201*a* forms a belongings list (referred to as a first belongings list) of the user 91 on the basis of the information read by the sensor 211 (step S403). The formed first belongings list is transmitted from the first searching device 201*a* to the server 100 by the communication means 213. The server 100 stores the first belongings list into the storage means 104 (step S404) That is, the list of the article 90 and so on carried by the user 91 when the user 91 goes out of the home is formed as the first belongings list, and the formed first belongings list is stored into the server 100.

FIG. 5A shows one example of the first belongings list. The list includes the user code (list), the position (a combination of latitude, longitude, and altitude of the searching device), the time (time period), and the article codes of belongings (first belonging, second belonging, . . . , M-th belonging) arranged in order from the top. An end code (EOF) that represents the end of the list is attached to the tail of the list. It is noted that M is the total number of the belongings listed in the user code.

The "user code" is obtained by reading the information stored in the identification tag 103 attached to each article 90 carried by the user 91 (see FIG. 2). The belongings 90 of the user 91 sometimes include articles borrowed from, for example, a family member or an acquaintance. In the case, a user code different from that of the user who is currently carrying the article is read from the identification tag 103 of the borrowed article. In the case, all the user codes (the user code of the user who is currently carrying the article and the user code of the family member or the acquaintance) are included in the "user code" of the list, and a list is formed for each user code.

It is noted that the "position" is the position where the information of the identification tag 103 is read, and the "time" is the time when the information of the identification tag 103 is read.

(Step S405)

It is determined whether or not the user 91 has passed by the next searching device (the second searching device 201*b* installed at the doorway of a building, store, or the like 93 or the first searching device 201*a* of the home 92) (whether or not the user 91 has passed through the doorway of the building, store, or the like 93 or the entrance of the home). The step S405 is repeated when the user 91 has not passed, and the program flow proceeds to step S406 when the user 91 has passed. It is herein assumed that the user 91 has moved and passed by the doorway of the building, store, or the like 93 where the second searching device 201*b* is installed.

(Steps S406, S407, and S408)

Similarly to the case where the user 91 has passed by the first searching device 201*a*, the information of the identification tag 103 attached to each article carried by the user 91 at the time is read by the sensor 211 of the second searching device 201*b* (step S406), and the list forming means 212 of the second searching device 201*b* forms a belongings list (referred to as a second belongings list) of the user 91 as the second belongings list (step S407). The formed second belongings list is transmitted from the second searching device 201*b* to the server 100, and the server 100 stores the second belongings list into the storage means 104.

It is herein assumed that the belonging 90*a* represented by an article code B0002 is left behind while the user 91 has moved from the first searching device 201*a* to the second searching device 201*b*. In this case, the second belongings list formed in step S407 is shown in FIG. 5B. If the first belongings list (see FIG. 5A) and the second belongings list are compared with each other, it can be understood that the belonging (article code: B0002) (purse) 90*a*, which has existed in the first belongings list, have disappeared in the second belongings list.

(Step S409)

The lost article specifying means 105 of the server 100 executes a lost article specifying process to specify the lost article. The processing is performed according to the flowchart shown in FIG. 6.

First of all, the memory of the past list is secured and cleared in step S601. The "past list" is a list necessary for specifying the lost article as described later.

In the subsequent step S602, one belonging (I) included in the second belongings list is extracted.

It is determined in step S603 whether or not the extracted belonging (I) is the end code (hereinafter simply referred to as "EOF") that represents the end of the list. The program flow proceeds to step S606 when the answer is YES or proceeds to step S604 when the answer is NO.

In step S604, a list, which includes the belonging (I) extracted from the belongings list formed in the past and is immediately preceding the list at the present time (the second belongings list in this case), is retrieved from among the belongings lists stored in the storage means 104. When the list exists in the belongings lists stored in the storage means 104, all the articles included in the list are added to the past list.

Then, the belonging number (I) is incremented by one in step S605, and the program flow returns to step S602.

Thus, with regard to each article included in the belongings list at the present time, the list, which includes the article and is formed immediately preceding the list at the present time, is retrieved from among the belongings lists stored in the storage means 104. When the list exists, all the articles included in the list are added to the past list. However, when the article to be added to the past list has already been included in the past list, the article is not added to the list. That is, an identical article is prevented from being duplicately added to the past list. As a result, the articles included in the past list constitute a union of all the articles included in the list, which has been formed in the past including the article and formed immediately precedingly, with regard to each of the articles included in the list formed at the present time point.

The contents of the past list becomes consequently the same only on the condition that "the articles included in the past list are not duplicated" even if the condition of "the immediately preceding list" is not added when the belongings list formed in the past is retrieved from among the belongings lists stored in the storage means 104. However, by adding the condition of "the immediately preceding list", the amount of data processing is reduced, and the processing time is reduced.

The processes of step S602 through step S605 are described in concrete as the processes of the first belongings list and the second belongings list with reference to FIGS. 5A and 5B.

First of all, B0001 (e.g., watch), which is the belonging (1) included in the second belongings list, is extracted in step S602. Then, it is determined in step S603 whether or not the belonging (1) is EOF. Since the answer is NO in this case, the program flow proceeds to step S604 to retrieve the immediately preceding belongings list including the belonging (1)=B0001 (e.g., watch) from among the belongings lists stored in the storage means 104. In this case, the first belongings list is retrieved from among the belongings lists stored in the storage means 104, and all the articles (B0001 through B000M) included in the first belongings list are added to the past list.

Next, the program flow returns to step S602 to extract B0003 (e.g., umbrella), which is a belonging (2) included in the second belongings list, and the first belongings list is retrieved from among the belongings lists stored in the storage means 104 in step 604. However, the articles included in the first belongings list, which have been included in the past list, are not newly added to the past list. The immediately preceding belongings list including the articles of the belonging (2) through the belonging (M−1) included in the second belongings list {note that M represents the total number of the belongings carried (carried and subject to article management) by the user 91} is the first belongings list. Therefore, the past list consequently comes to have the same contents as those of the first belongings list, and the program flow proceeds to step S606.

In step S606, the articles included in the list at the present time point is deleted from the formed past list. When no article remains in the past list through the process, it can be determined that there is no lost article because there is no difference between the past belongings list and the current belongings list, i.e., the articles carried in the past are currently carried.

On the other hand, when an article remains in the past list, the article is the one that has been carried in the past but not currently carried, and therefore, the article can be presumed to be the lost article.

In this case, the past list includes all the articles included in the first belongings list, and the second belongings list includes all the articles excluding B0002 (e.g., purse). Therefore, when the articles included in the list at the present time point are removed from the formed past list, the article of B0002 is left in the past list.

When an article is left in the past list, a lost article list of the article is formed. FIG. 7 shows one example of the lost article list. The list includes the user code, the position and time of the obtainment of the first belongings list, the position and time of the obtainment of the second belongings list, and the lost article (although one lost article 1 is listed in the illustrated example, if a plurality of articles exist, the articles are arranged in order) arranged in order from the top. The end code (EOF) that represents the end of the list is attached to the tail of the list.

In this case, it is desirable to state the article name besides the code for each of the lost articles included in the lost article list. Since the article code (the article code B0002 of the purse in the example of FIG. 7) has one-to-one correspondence to the product information, the article name can be obtained by the lost article specifying means 105 from related information, which is stored in the storage means 104 and in which the article code and the product information have one-to-one correspondence.

Figure 4:
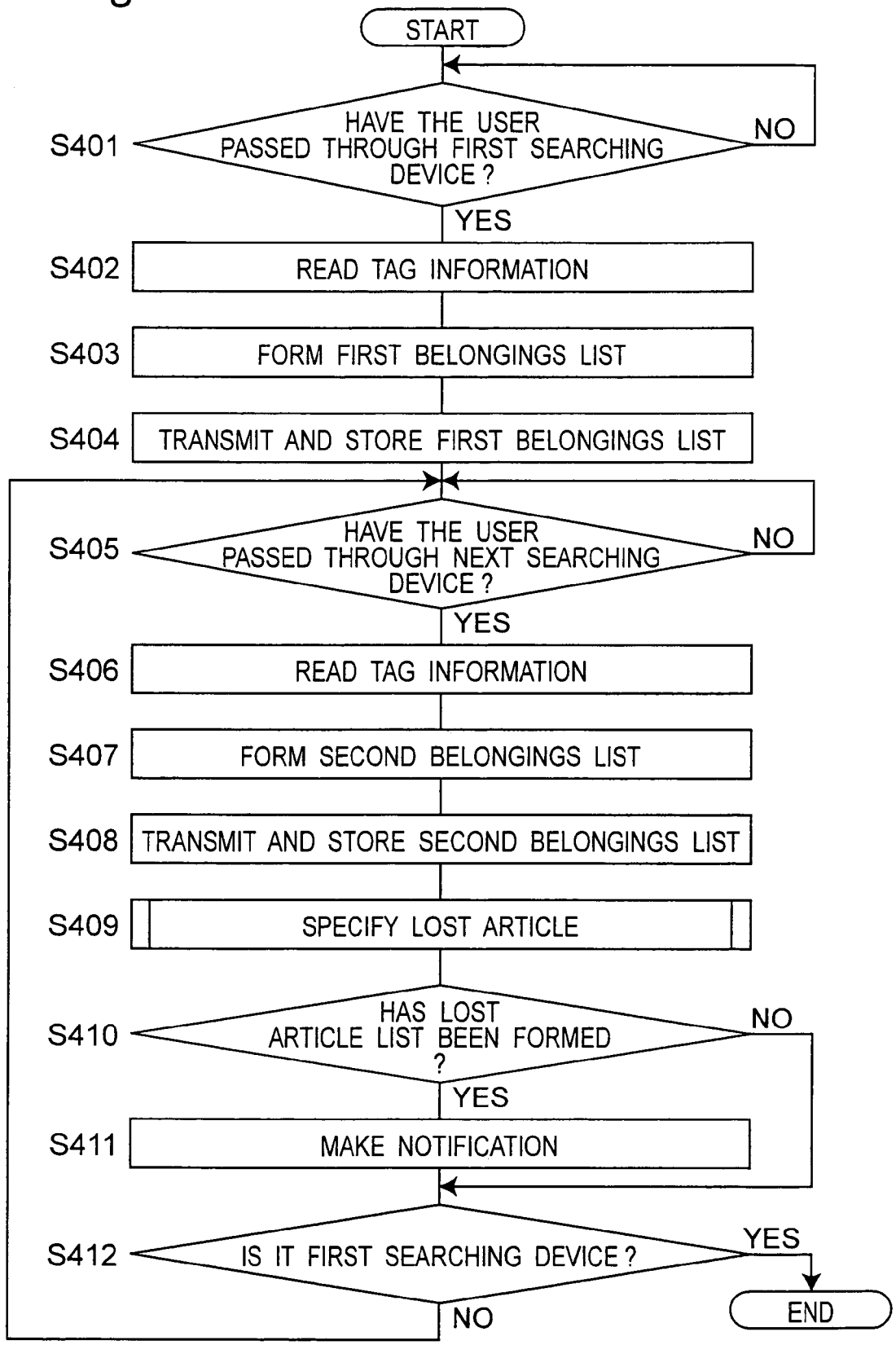
FIG. 4 is a flowchart for explaining the operation of the article management system of the first embodiment.

The lost article specifying process in step S409 is thus ended, and the program flow proceeds to step S410 of the flowchart of FIG. 4.

(Step S410)

It is then determined in step S410 of the flowchart of FIG. 4 whether or not the lost article list is formed in step S409 (whether or not any lost article exists). The program flow proceeds to step S412 when there is no lost article or proceeds to step S411 when there is a lost article.

(Step S411)

When a lost article exists, the notification means 106 notifies the portable telephone or the like of the user 91 of the lost article list formed by the lost article specifying means 105. As a notification method in this case, several methods can be considered, and examples are enumerated below.

(1) The notification means 106 transmits by mail the lost article list to the portable telephone 41 carried by the user 91 via the network 31, the portable telephone public network 33, and the base station 34. As the mail address of the user, the mail address registered to the service-utilizing organization by the user can be used (it is acceptable to register a plurality of mail addresses, and, in the case, it is proper to give notification to each of the mail addresses). It is herein noted that the user 91, who is the destination of notification, is the user specified by the user code included in the lost article list.

(2) The notification means 106 forms the lost article list as a Web page and uploads the page to the Web server 32 via the network 31. By this operation, the user 91 can browse the lost article list by means of a browser from anywhere via the network 31. In this case, it is acceptable to transmit the URL (Uniform Resource Locators) of the Web page to the portable telephone 41 of the user 91 to enable the browsing from the portable telephone 41. Furthermore, by concurrently giving notification to the PC (Personal Computer) of the user 91 (for example, it is proper to give notification to the PC at the home or the like by mail), the user 91 can perceive the lost article by browsing the Web page via the network 31 after returning home even when the user does not have the portable telephone 41 or has lost the portable telephone 41.

Moreover, it is acceptable to provide each searching device 201 with a speaker and make the notification means 106 of the server 100 transmit the lost article list to the Web server 32 concurrently issuing a warning sound of "pop", a voice message that "Is there anything left behind?" or the like from the speaker of the searching device 201 where the lost article has been specified. The user 91 can perceive the loss of the belonging by hearing the warning sound. With this arrangement, the information of the lost article can be obtained at an early stage by browsing the Web page by means of the browser of, for example, the handy PC, portable telephone, or the like.

(Step S412)

Next, it is determined whether or not the searching device 201, by which the user has passed, is the first searching device 201a. The processing ends when the answer is YES, or the program flow returns to step S405 when the answer is NO. In other words, the article management processing ends when the user 91 returns home (when the answer is YES), or similar article management processing is repeated again in the other state (when the answer is NO).

As described above, the present article management system forms a belongings list every time the user 91 passes by the sensor 211 and specifies the event that the user 91 has lost the belonging 90a on the basis of the belongings list. Therefore, even if the user 91 does not perceive the loss of the belonging 90a, the information of the lost article 90a can be obtained. Then, the user 91 can recognize the loss of the belonging 90a at an early stage.

Moreover, the lost article list notified to the portable telephone or the like of the user 91 includes not only the information of the lost article 90a but also the information of the searching device 201 by which the user 91 has passed. Therefore, information of the place where the user 91 has lost the belonging 90a (between the first searching device 201a and the second searching device 201b in the above example) is obtained, by which the user 91 can more easily search for the lost article 90a.

(Second Use Scene)

The second use scene is a scene in which the article that the user has lost in the first use scene is carried and moved by a third person other than the user. This corresponds to a case where the article that the user has lost is the article stolen by the third person or a case where the third person who has picked up the article that the user has dropped is on the way to a police station or the like to deliver it. The operation of the system is herein described assuming that the user has been robbed of his or her belonging by a thief 99.

It is herein assumed that the thief 99 has passed by either one searching device (herein assumed to be a third searching device) 201c (see FIG. 3) before the theft, a belongings list (third belongings list) of the thief 99 is formed at that time and the third belongings list is stored in the storage means 104 of the server 100 (see FIG. 8A). It is further assumed that the thief 99 passes again by the third searching device 201c after the theft, a new belongings list (fourth belongings list) is formed in accordance with it, and the fourth belongings list is transmitted to the server 100 and stored into the storage means 104.

It can be understood that the fourth belongings list, which is formed at the time and stored in the storage means 104, has an additional article (article code 0002) (e.g., purse) as shown in FIG. 8B in comparison with the third belongings list shown in FIG. 8A.

Figure 6:
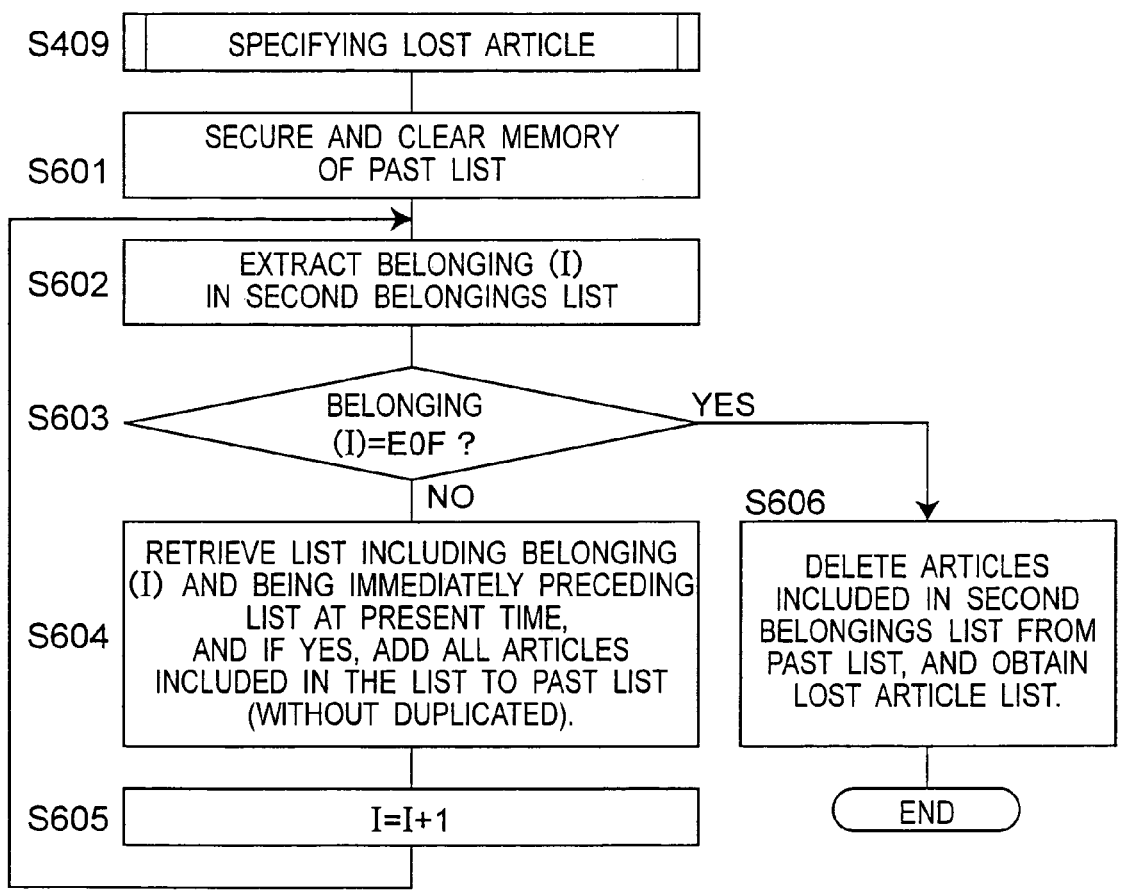
FIG. 6 is a flowchart of a process for specifying the lost article.

After receiving the fourth belongings list, the lost article specifying means 105 of the server 100 starts the lost article specifying process for specifying the lost article on the basis of the fourth belongings list according to the flowchart shown in FIG. 6. The process is described with reference to FIG. 9.

First of all, the article code B0002 (purse) included in the fourth belongings list is extracted (step S602), and another belongings list that includes the article is retrieved from among the belongings lists stored in the storage means 104. In this case, the first belongings list (see FIG. 5A) formed about the rightful owner of the article is retrieved from among the belongings lists stored in the storage means 104 (see S604-1 of FIG. 9) before the article (purse) of the article code B0002 has been stolen, and all the articles (B0001 through B000M) included in the list are added to the past list (step S603 through step S606) (see S604-2 of FIG. 9).

Figure 9:
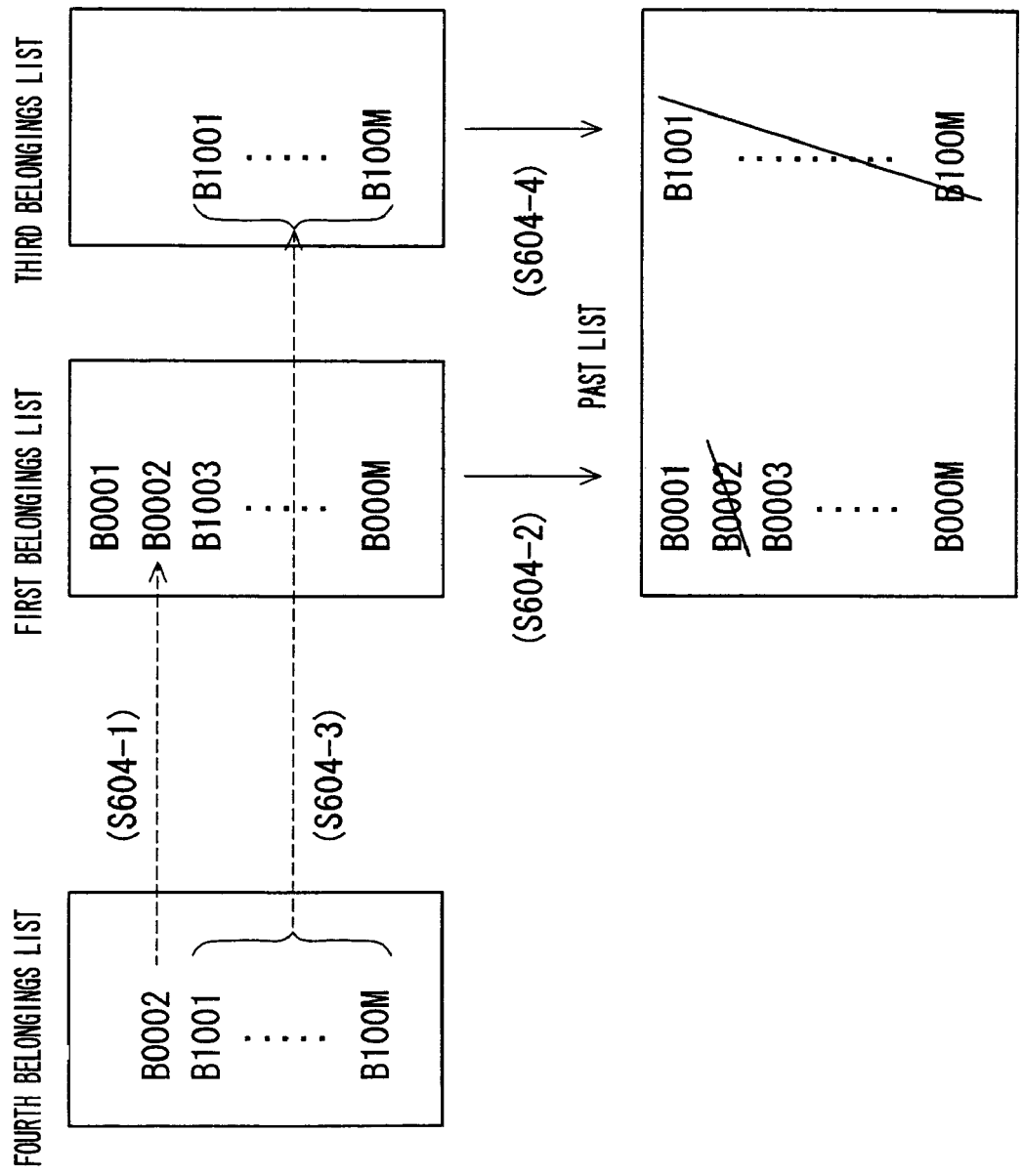
FIG. 9 is an explanatory diagram showing the procedure of a lost article specifying process.

Likewise, the article of the article code B1001 included in the fourth belongings list is extracted, and the third belongings list that includes the article (belongings list formed before the theft committed by the thief 99) is retrieved from among the belongings lists stored in the storage means 104 (see S604-3 of FIG. 9). Then, all the articles (B1001 through B100M) included in the third belongings list are added to the past list (see S604-4 of FIG. 9).

Then, each article included in the fourth belongings is deleted from the past list (see the slant lines of FIG. 9, meaning that the article codes B0002 and B1001 through B100M are deleted from the past list). By so doing, a lost article list that includes the article codes B001 and B0003 through B000M is formed as shown in FIG. 10A (step S606) (note that the lost article of the article code B0002 (purse) is not included in the lost article list). The lost article list is thus formed by the lost article specifying means 105, and the lost article list is notified to the portable telephone or the like of the user 91 by the notification means 106. In this case, the user 91 to be notified is the user associated with the article code included in the formed lost article list. In order to prevent the user 91 from being treated as a thief when the article of a family member or an acquaintance is handed over (kept or given) to the user 91 himself or herself on the way, it is desirable to preparatorily store the user code(s) of the intimate person(s) (family member(s) and/or friend(s)) while mutually correlating them and not to send notification when the user code of the intimate person is attached to the article handed over or to send notification by presenting the name of the holder (the user 91 in this case) to indicate that the article handed over has not been the stolen. In this case, an approving process of both the parties is necessary for the association of the user codes among the intimate persons.

The user 91, who has received the notification, is to perceive the event that the article (article (purse) of the article code B0002) has been lost (stolen) because the user ought to carry all the articles included in the lost article list and the article (article (purse) of the article code B0002) that has been carried by the user at the time of going out of his or her home is not included in the list.

It is difficult to immediately perceive which article has been lost from the lost article list shown in FIG. 10A. Accordingly, it is preferable to devise the lost article list to give notification to the portable telephone or the like of the user 91 as follows.

That is, as shown in FIG. 10B, the list (first belonging list in this case) formed when the user 91 has passed by the searching device 201a last time is extracted and the list is compared with the lost article list by the lost article specifying means 105. Then, the articles included in the lost article list, i.e., the articles that have not been stolen are highlighted in display so as to become conspicuous by being colored, flashed, changed in character font or with the display of a special character ("★" in the example of FIG. 10B) before the name of the article on the list. With this arrangement, the stolen article and the articles that have not been stolen can be displayed in distinction. Conversely, only the stolen article may be highlighted by being colored, flashed, changed in character font or with the display of a special character (e.g., "★") before the name of the article on the list.

The processing of the lost article list as shown in FIG. 10B may be performed by the lost article specifying means 105 according to a request for performing the processing made by the user 91, who has received the lost article list of, for example, FIG. 10A, to the server 100 via the portable telephone 41 or the like. That is, the processing of the lost article list may be performed by the lost article specifying means 105 when the user 91 makes a request for comparing the lost article list with the belongings list of the user himself or herself to the server 100.

Moreover, it is acceptable to automatically process the list by the lost article specifying means 105 on the basis of the progress of the user code included in the belongings list. That is, the user code included in the belongings list is the user code corresponding to the article code included in the list as described hereinabove. Therefore, if the thief 99 passes by the searching device 201c while carrying the stolen article, the user code associated with the stolen article is included in the fourth belongings list with the user code of the thief 99. That is, a user code (e.g., U1234) corresponding to the article B0002 is added to the user code of the fourth belongings list of FIG. 8B with respect to the user code (e.g., U4321) of the third belongings list of FIG. 8A. It is acceptable to determine the possibility of the theft by the lost article specifying means 105 by pursuing the history of the increase of the user codes by the lost article specifying means 105 and thereby process the lost article list by the lost article specifying means 105 as shown in FIG. 10B.

In the second use scene, the lost article list is automatically notified to the portable telephone or the like of the user 91 as a consequence of the pass of the third person who is carrying the article by the searching device 201c even when the user who has suffered a theft (the user who has lost a belonging) does not pass himself or herself by the searching device 201. That is, the user 91 can recognize the event that the belonging has been stolen at an earlier stage.

Moreover, the lost article list includes the information of the searching device (third searching device) 201c by which the thief 99 has passed, and therefore, it is also possible to utilize the information for the tracing of the thief 99.

Second Embodiment

Figure 11:
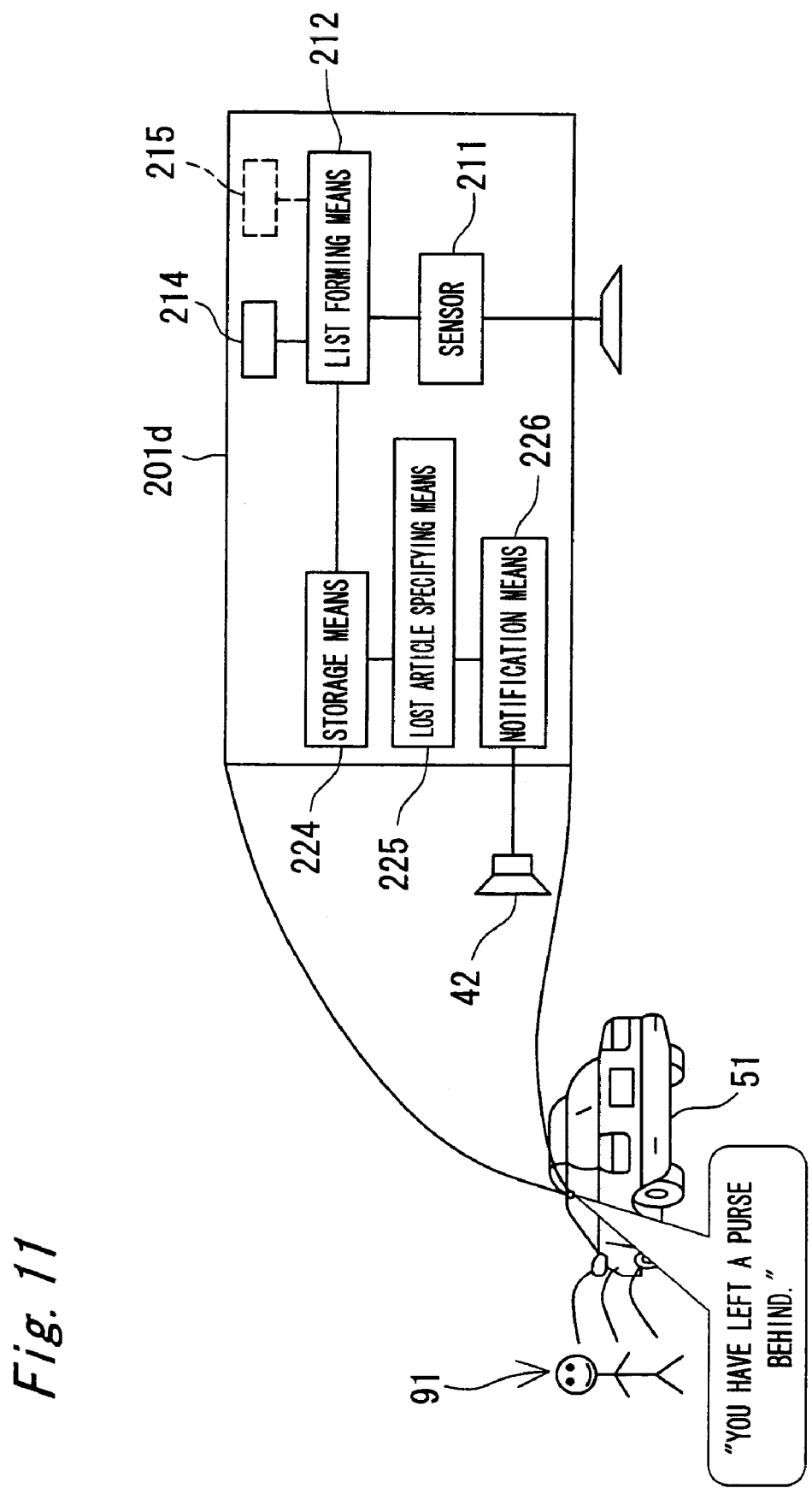
FIG. 11 is a block diagram of the article management system of the second embodiment.

The article management system of the second embodiment is a system that copes with a scene in which the user has lost his or her belonging in the vehicle in which the user has ridden. FIG. 11 shows a diagram of the constitution of the present system.

The present system has one searching device-cum-article-management unit 201d installed at the door of a vehicle (a taxi 51 in the present example).

The searching device-cum-article-management unit 201d has a sensor 211, a list forming means 212, a storage means 224, a lost article specifying means 225, and a notification means 226. By thus providing one searching device-cum-article-management unit 201d with the means necessary for the present system, the system construction can be restrained to the minimum. As described above, it is acceptable to provide a server 100 connected via the network 31 besides the searching device-cum-article-management unit 201d.

The sensor 211, the list forming means 212, the storage means 224, and the lost article specifying means 225 have the same functions as those of the respective constructions described above (i.e., the sensor 211, the list forming means 212, the storage means 104, and the lost article specifying means 105 of the first embodiment). Moreover, the notification means 226 is connected to an informing device 42 of, for example, a speaker, and the notification means 226 gives notification to the user 91 by issuing a sound from the speaker 42. In concrete, the notification means 226 has a function to form voice data for making a voice according to the information of the lost article and the user information by using a speech synthesis technology or the like and gives forth a sound from the speaker 42.

The operation of the whole system of the second embodiment is described next. The operation is basically almost the same as the operation indicated by the flowcharts shown in FIGS. 4 and 6.

First of all, when the user 91 gets on a taxi 51, the sensor 211 of the searching device-cum-article-management unit 201d installed in the taxi 51 reads the information of the identification tags 103 attached to the belongings of the user 91 (corresponding to step S401 and step S402 of FIG. 4). The list forming means 212 forms a belongings list on the basis of the information read by the sensor 211 (corresponding to step S403). The formed list is stored into the storage means 224 (corresponding to step S404).

Next, when the user 91 gets off the taxi 51, the searching device-cum-article-management unit 201d reads again the information of the identification tags 103 (corresponding to step S405 and step S406), and the list forming means 212 forms a belongings list (corresponding to step S407) and stores the list into the storage means 224 (corresponding to step S408 except for the transmission operation). The lost article specifying means 225 specifies the lost article on the basis of the thus-formed belongings list when the user have got on the vehicle and the belongings list when the user have got off the vehicle (corresponding to step S409).

In concrete, by using the belongings list when the user have got on the vehicle as the past list and using the belongings list when the user have got off the vehicle as the current belongings list, the articles included in the belongings list when the user have got off the vehicle are deleted from the belongings list when the user have got on the vehicle (corresponding to step S601 through step S606 of FIG. 6). By so doing, when an article is left in the belongings list when the user have got on the vehicle, the article is estimated as the lost article, i.e., the article that the user 91 has left behind in the taxi 51.

Thus, when a lost article exists (corresponding to YES in step S410 of FIG. 4), the existence of the lost article message is given from the speaker 42 by a sound or voice by the notification means 106 (corresponding to step S411). For example, it is acceptable to give a voice message that "Mr. Matsushita, you have left a purse behind." or the like by speech synthesis of the name of the user 91 and the name of the lost article. It is acceptable to give merely a voice message that "There is a thing left behind." or the warning sound of "pop" mentioning neither the name of the user 91 nor the name of the article in order to protect the privacy of the user 91.

In the system, by giving notification to the portable telephone or the like of the user 91 by the sound, voice or the like directly from the searching device-cum-article-management unit 201d, the user 91 need not carry the device 41 of, for example, the portable telephone or the like for receiving notification.

In the second use scene, it is desirable to make the list forming means 212 form a list every user and make the lost article specifying means 225 specify the lost article from a pair of belongings lists (the belongings list when the user have got on the vehicle and the belongings list when the user have got off the vehicle) every user. By so doing, it becomes possible to specify the lost article every fare (user) even if a plurality of fares (users) concurrently get on and off the taxi 51.

Moreover, it is acceptable to further provide the searching device-cum-article-management unit 201d with a communication means (provided like the communication means 213 of FIG. 3) and give notification to the portable telephone or the like of the user 91 of, for example, the lost article list as shown in FIG. 12 via the communication means (communication means 213 of FIG. 3) when the lost article has occurred. In this case, the method (1) for giving notification to the portable telephone 41 carried by the user 91 and the method (2) for uploading the lost article list to the Web server 32 can be adopted as the notification method in this case as described in connection with the first embodiment. In this case, it is acceptable to store the mail address of the user 91 of the destination of notification as user information into the identification tag 103 attached to each article or obtain the mail address by storing only the user ID that identifies the user into the identification tag 103 and inquiring the server about the address on the basis of the user ID.

The lost article list includes the information of user code, means of transportation, TEL, number plate, onboard position, onboard time, lost article, end code, and so on in order from the top.

The name of the taxi company is entered in the "means of transportation", the telephone number of the taxi company is entered in the "TEL", the number plate or the identification number of the taxi in which the user has ridden is entered in the "number plate", the information of latitude, longitude, and altitude measured by the searching device-cum-article-management unit 201d (the position measuring function of the position measurement part 215 when the searching device-cum-article-management unit 201d has the position measurement part 215 or the position measuring function possessed by the taxi (the GPS can be used as described above)) is entered in the "onboard position". That is, it is appropriate to include the information capable of specifying the taxi in which the user has ridden in the lost article list. It is appropriate to preparatorily store these pieces of information (excluding the information of the onboard position) in the searching device-cum-article-management unit 201d.

The lost article list may include not only the position where the user have got on the vehicle but also the position where the user have got off the vehicle.

Moreover, when the taxi 51 is equipped with a car navigation system, the lost article list may include the information of the travel route of the taxi.

The present system can also be applied to all of the means of transportation including bus, railway, and so on besides taxi.

Moreover, without being limited to the vehicles, the system can easily be applied to general facilities and buildings (restaurants, tearooms, amusement parks, public facilities, and so on).

The searching device-cum-article-management unit 201d of the system in FIG. 11 can be also made to store an article management program for achieving, for example, a function to connect the sensor 211 to a general computer system that has a communication function and form in the computer a list of the articles carried by the user at the time point on the basis of information obtained by reading the information concerning the owner of each of the articles carried by the user from the identification tag attached to each of the articles, a function to determine whether or not the user is the rightful owner of the article carried by the user on the basis of the formed list, and a function to notify the owner of the article of the information concerning the article when it is determined that the user is not the rightful owner of the article at the time of person identification, into a storage device (hard disk or the like) and execute the program by reading the computer program into a temporary storage device (semiconductor memory or the like) by means of a CPU for the execution of the processes (functions).

Further, the technology of notifying the information of the vehicle after the user gets off the taxi or another means of transportation is also effective even when the lost article is not specified by the lost article specifying means 225.

That is, the fare, who has used the taxi or another means of transportation, is notified of the information of the vehicle in which the fare has ridden by means of, for example, mail to the user.

Thus, although it is generally difficult to specify the vehicle in which the user has ridden even when the user perceives the event that the user has left a thing behind later, the user 91 can easily make inquiry about the thing left behind by the notification of the information of the contact address and so on of, for example, the taxi company or the like, assuring a great convenience.

Moreover, in a case where the present second embodiment is applied to a place with a time limit (e.g., a coin-operated locker, a hotel room, a cloakroom, a parking lot, a conference hall, or the like), when the user 91 leaves the place with a belonging left behind, the belonging is erroneously determined as a lost article and the information is onerously immediately sent to the user 91. Accordingly, it is desirable to notify the user 91 of loss at a time determined in each place (or a predetermined time earlier than the service finish time). In this case, it is desirable to provide the article management system with a communication system of the communication means 213 of FIG. 3 or the like for giving notification to the portable telephone or the like of the user 91 in a place remote from the searching device-cum-article-management unit and a timing part (or timing means) 214 for determining whether or not it reaches the determined time.

FIG. 22 is a flowchart showing the operation when the user 91 deposits an article in a place with a time limit. Since step S2201 through S2209 have operations similar to those of steps S401 through S409 of FIG. 4, no description is provided therefor. In step S2210 (corresponding to step S410), when a lost article exists and it is determined in step S2211 that it has exceeded the prescribed time by the timing part (or timing means) 214, then notification is given to the portable telephone 41 of the user 91 who is the owner in step S2212 (corresponding to step S411) by the notification means 226 via the network 31, the portable telephone public network 33, and the base station 34 of FIG. 3.

It is noted that the time, which is normally set on the service providing side (coin-operated locker, parking lot, or the like), may also be freely set by the user 91 by means of the portable telephone 41 or the like of the user 91. When the user 91 receives a service monetarily charged in accordance with the time of deposit in a parking lot or the like, it is desirable to give notification to the portable telephone or the like of the user 91 at constant time intervals (e.g., at intervals of 30 minutes) (e.g., at time intervals of deposit to perceive the charge).

Moreover, dissimilarly to the case where the user (user 91) enters with an article as in a hotel room or a parking lot, the searching device-cum-article-management unit does not generate two belongings lists when the user (user 91) does not concurrently enter with an article into the place of deposit such as a coin-operated locker or a cloakroom (i.e., the two belongings lists to be generated when the user 91 gets in and out of the place are not generated). Therefore, in the above case, it is desirable to generate a belongings list by means of a list forming means using a trigger (corresponding to step S2201 and step S2205) that takes the place of the pass of the user 91 by the searching device-cum-article-management unit as a clue. For example, in the case of the coin-operated locker, the pass of the user 91 by the searching device-cum-article-management unit in front of the coin-operated locker (step S2201) is used as the trigger for the list formation when the article is deposited (when getting in the place), and the actions of closing and locking the door of the coin-operated locker by the user 91 (corresponding to step S2205) is used as the trigger for the list formation when the user 91 deposits an article in the coin-operated locker and leaves the place (when getting out of the place).

As described above, in the present system, by providing the searching device-cum-article-management unit at the doorway of a vehicle or the like and forming the belongings list every time the user 91 passes through the doorway of the vehicle or the like, the event that the user has lost the belonging in the vehicle or the like can be specified, and the user 91 is immediately notified of the event. Thus the user 91 can be prevented in advance from leaving a thing behind in a vehicle or the like.

Third Embodiment

Figure 13:
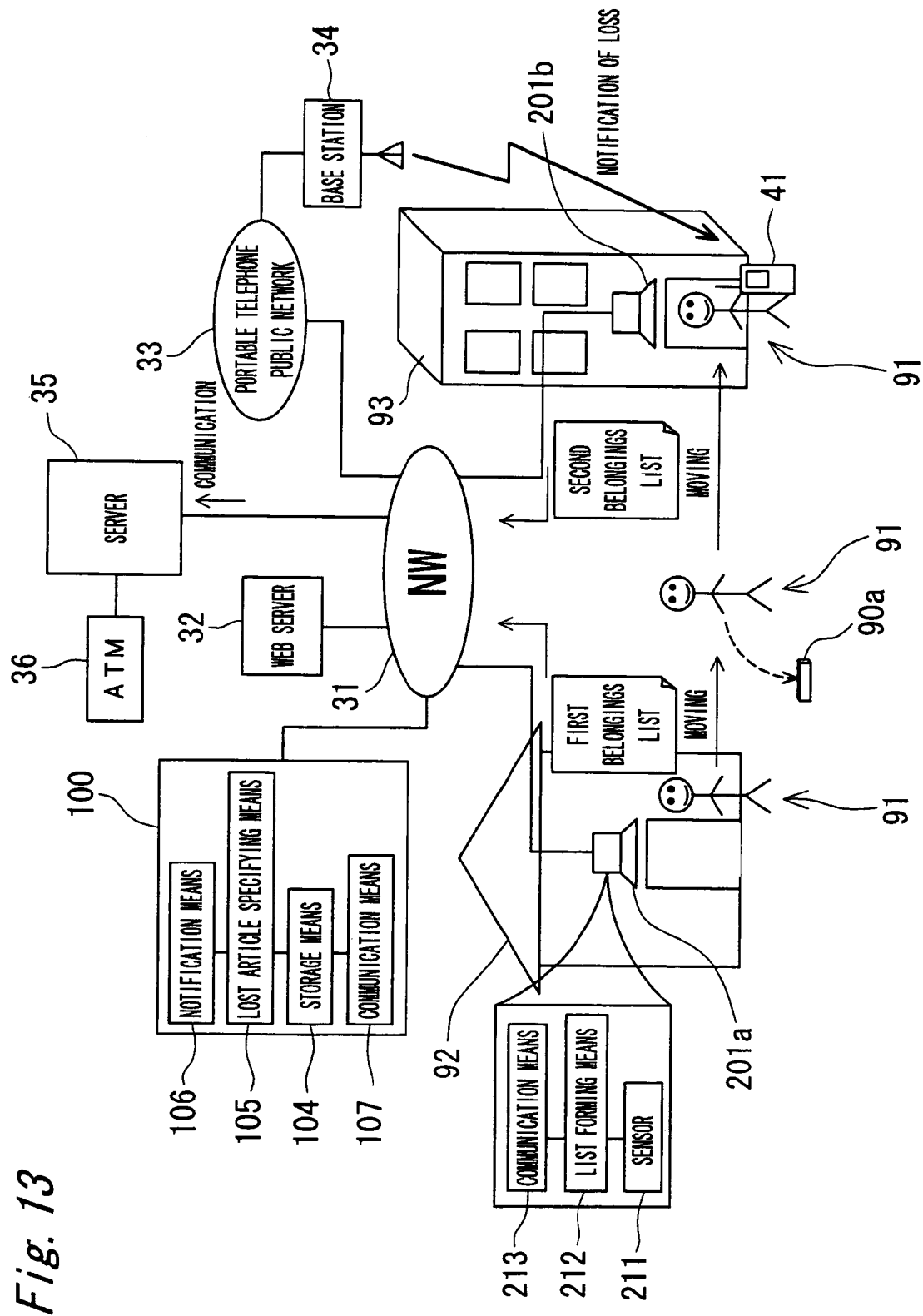
FIG. 13 is a block diagram of the article management system of the third embodiment.

The article management system of the third embodiment is a system in which, when the user 91 has lost his or her belonging, prescribed notification is given to the organization related to the lost article prescribed in accordance with the attribute of the lost article. FIG. 13 shows a diagram of the constitution of the present system. The article mentioned here is an article of, for example, a credit card or a cash card, which can be used only by the owner himself or herself of the article and should be prevented from being used by others. The system of the third embodiment has roughly the same construction as that of the system of the first embodiment, and the same constituents are denoted by the same reference numerals with no detailed description provided therefor.

The present system, which has roughly the same construction as that of the system of the first embodiment as described above, differs from the system of the first embodiment in that the server 35 or the like of the related organization or facility (credit card company or the like) (hereinafter referred to as "the server of the related organization") is connected to the network 31. An ATM (automated teller machine) 36, for which a credit card or a cash card can be used, is connected to the server 35 of the related organization (numbers of ATM's are connected to the server 35 of the related organization although only one ATM 36 is shown in the example of FIG. 13), and the ATM 36 is managed by the server 35 of the related organization. In the system of the third embodiment, the same constituents as those of the system of the first embodiment are denoted by the same reference numerals, and no detailed description is provided therefor.

As described above, when the lost article is specified, the present system automatically gives notification to the server 35 of the related organization about the lost article. Therefore, it is necessary to associate each article with the server 35 of the related organization corresponding to the article.

FIG. 14A is a diagram showing one example of the data structure stored in the identification tag 103, where the article information includes the information of article code, contact address code, communication content code, and so on in this case.

The "contact address code" is the code that represents the contact address of the organization related to the article. As shown in FIG. 14B, a table (contact address code table), which includes the contact address code and the contact address (name and mail address) corresponding to the code, is preparatorily formed, and the contact address code table is stored into the storage means 104 of the server 100. It is noted that the identification tag 103 may include not the contact address code but the mail address itself of the server 35 of the related organization.

Moreover, the "communication content code" represents the contents of communication with the server 35 of the related organization, and the contents of communication include at least one of temporary suspension, suspension, and the like in the case of, for example, a credit card. As shown in FIG. 14C, a table (communication content code table) is formed by assigning a communication content code to each communication content, and the communication content code table is stored into the storage means 104 of the server 100. The communication content code table is also retained in the server 35 of each related organization included in the contact address code table.

It is acceptable to manage the contact address code table and the communication content code table so that the tables become consistently updated information in the storage means of another server on the network 31 instead of storing the tables into the storage means 104 of the server 100 and make the server 100 and the server 35 of the related organization refer to the information stored in the storage means of the another server at need.

The operation of the present system is described in accordance with a scene in which the user 91 has lost his or her credit card.

The system operates roughly according to the flowcharts shown in FIGS. 4 and 6. When it is determined in step S410 that a lost article (a credit card in this case) exists in the lost article list, the notification means 106 gives notification to the server 35 of the related organization in step S411.

In concrete, the notification means 106 obtains the contact address code and the communication content code by referring to the article information of the lost credit card. Then, the article information, the user code, and the communication content code are transmitted to the mail address corresponding to the contact address code by referring to the contact address code table.

The server 35 of the related organization, which has the mail address corresponding to the contact address code and has received notification from the notification means 106, performs processing corresponding to the communication content code about the credit card corresponding to the user code by referring to the communication content code table. By the operation, the credit card that the user has lost is subjected to the processing of temporary suspension, suspension, or the like.

The notification means 106 may also transmit the information of the lost article and the mail of the contents transmitted to the server 35 of the related organization to the user himself or herself. In this case, the notification means 106 may concurrently give notification to the server 35 of the related organization and to the user himself or herself, or the notification means 106 may give notification to the user himself or herself after giving notification to the server 35 of the related organization. The notification means 106 may give notification to the server 35 of the related organization after giving notification to the portable telephone 41 or the like of the user himself or herself. In the case, the server 35 of the related organization may execute a confirmation procedure to give notification to the portable telephone 41 or the like of the user 91 or the like for confirming whether or not the processing of the temporary suspension, suspension, or the like of the credit card is allowed to be executed. Then, it is acceptable to determine the contents of communication of the notification means 106 with the server 35 of the related organization according to a reply from the user 91.

Moreover, it is acceptable to make the notification means 106 offers the information of the place presumed to be the site of the occurrence of loss (position information of the searching device 201 included in the lost article list of FIG. 7 or the like as described above) to the server 35 of the related organization and thereby make the server 35 of the related organization perform the processing of suspension or the like in the facility (store, ATM, CD (cash dispenser) machine, or the like in which the credit card can be used) existing in the neighborhood of the site of the occurrence of loss.

The article information of the identification tag 103 has included the article code, the contact address code, and the communication content code. However, without being limited to this, it is acceptable to make the article information include only the article code, form a code table in which the article code is consistently associated with unique contact address code and communication content code and store the code table into the storage means 104 or the like.

As described above, in the present system, when the lost article is an article that might be abused by others, such as a credit card or a cash card, the system automatically gives notification to the server 35 of the related organization even before the user perceives the lost article or before the user 91 perceives the lost article and gives notification to the server 35 of the related organization. Therefore, the abuse of the credit card or the like is prevented in advance, and high security can be assured.

Fourth Embodiment

The article management system of the fourth embodiment is a system in which, when the user 91 has lost his or her belonging, the information of the travel route of the user 91 led to the loss of the article is provided for the user 91 in addition to the information of loss. This allows the user 91 to find the lost article more easily.

Figure 15:
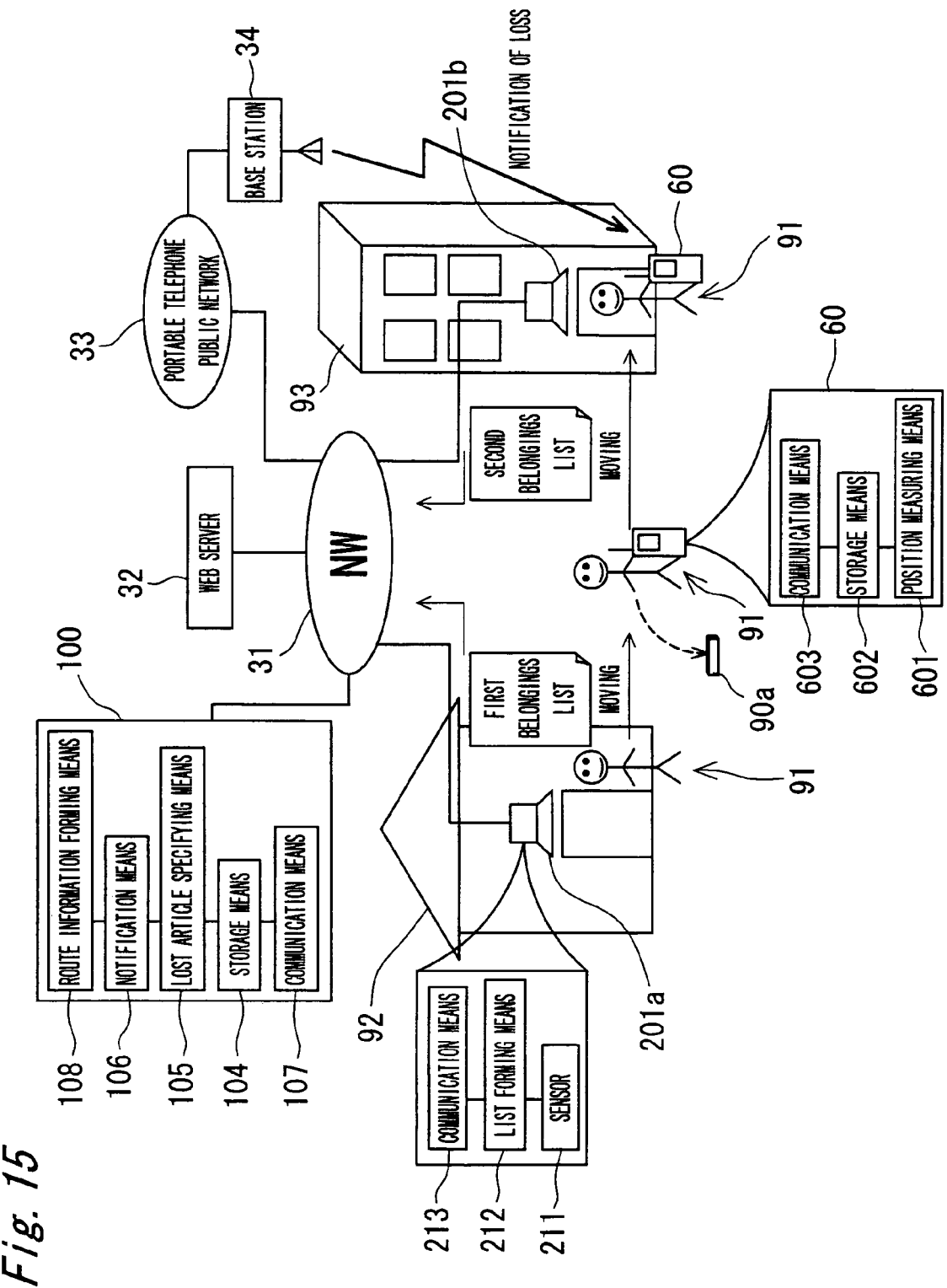
FIG. 15 is a block diagram of an article management system of the fourth embodiment.

FIG. 15 is a block diagram of the article management system of the fourth embodiment. The system of the fourth embodiment has roughly the same construction as that of the first embodiment, and the same constituents are denoted by the same reference numerals with no description provided therefor.

As a point of difference between the system of the fourth embodiment and the system of the first embodiment, there can be enumerated the point that the server 100 further has a route information forming means 108 and the user 91 carries a position measurement device 60 in the system of the fourth embodiment.

The position measurement device 60 is the device carried by the user 91 as described above, and the device moves in accordance with the movement of the user 91. The position measurement device 60 includes a position measuring means 601, a storage means 602, and a communication means 603.

The position measuring means 601 is a means for measuring the self-position and is able to utilize the GPS system that measures the self-position on the basis of electric waves from a plurality of satellites.

The storage means 602 successively stores the information of the position (current position) measured by the position measuring means 601 as described later.

The communication means 603 is a means for performing wireless communications between the means 603 and each searching device 201 and transmitting the position information stored in the storage means 602 to the searching device 201 in this case. For the wireless communications in this case, for example, a portable telephone, a wireless LAN, or the like can be considered. In the case of the wireless LAN, it is desirable to include the function of the access point of the wireless LAN in the searching device 201.

The position measurement device 60 can be provided by a portable telephone equipped with, for example, a GPS receiver.

The route information forming means 108 specifies the route through which the user 91 has moved upon receiving the position information, which has been measured by the position measuring means 601 and sent from the position measurement device 60 to the server 100 via the searching device 201 and the network 31, and processes the route information as data to be notified to the portable telephone or the like of the user 91. The processed information is notified together with the information of the lost article by the notification means 106 to the portable telephone or the like of the user 91 via the network 31.

The article management system of the fourth embodiment operates according to the flowchart shown in FIG. 16, and the operation of the present system is described here in accordance with a scene in which the user 91 has dropped his or her belonging somewhere while walking in a town. The first searching device 201a is installed at the entrance of the home 92, and the second searching device 201b is installed at the doorway of the building, store, or the like 93.

(Step S1601)

It is determined whether or not the user 91 has passed by the first searching device 201a. The step S1601 is repeated when the user has not passed, or the program flow proceeds to step S1602 when the user has passed.

(Steps S1602, S1603, and S1604)

The information of the identification tag 103 attached to each article carried by the user 91 is read by the sensor 211 of the first searching device 201a (step S1602), and the list forming means 212 of the first searching device 201a forms the belongings list (first belongings list) of the user 91 on the basis of the information read by the sensor 211 (step S1603). The formed first belongings list is transmitted from the first searching device 201a to the server 100 via the network 31 by the communication means 213. The server 100 stores the first belongings list into the storage means 104 (step S1604).

(Step S1605)

The first searching device 201a transmits a request for starting position measurement and recording to the position measurement device 60 carried by the user 91. Upon receiving the request, the position measurement device 60 starts the position measurement and recording. For example, the self position is measured by the position measuring means 601 every prescribed time, and the measurement result is stored into the storage means 602. Otherwise, an update self-position is measured every time the self-position moves more than a prescribed distance due to the movement of the user 91, and the measurement result is stored into the storage means 602.

(Step S1606)

It is determined whether or not the user 91 has passed by the next searching device (second searching device 201b or first searching device 201a). The step S1606 is repeated when the user has not passed, or the program flow proceeds to step S1607 when the user has passed. It is herein assumed that the user 91 has moved and passed by the doorway of a building or store 93 where the second searching device 201b is installed.

(Steps S1607 and S1608)

Similarly to the pass by the first searching device 201a, the information of the identification tag 103 attached to each article carried by the user 91 at the time is read by the sensor 211 of the second searching device 201b (step S1607), and the list forming means 212 of the second searching device 201b forms the belongings list (second belongings list) of the user 91 (step S1608).

(Steps S1609 and S1610)

The second searching device 201b transmits a request for stopping the position measurement and recording to the position measurement device 60, and position measurement device 60, which receives the request, stops the position measurement and recording (step S1609). Then, the position measurement device 60 transmits the position information (history of position information) stored in the storage means 602 to the second searching device 201b (step S1610).

(Step S1611)

The second searching device 201b transmits the formed second belongings list and the position information transmitted from the position measurement device 60 to the server 100 via the network 31, and the server 100 stores the pieces of information into the storage means 104.

It is herein assumed that the user 91 has dropped the belonging 90a represented by the article code B0002 while moving from the first searching device 201a to the second searching device 201b.

(Steps S1612 and S1613)

The lost article specifying means 105 of the server 100 executes a process for specifying the lost article (step S1612). The processing is performed according to the flowchart shown in FIG. 6 described hereinbefore. Then, it is determined whether or not a lost article list has been formed, or whether or not a lost article exists. The program flow proceeds to step S1616 when no lost article exists, or the program flow proceeds to step S1614 when a lost article exists (step S1613).

(Step S1614)

When the lost article exists, the route information forming means 108 of the server 100 forms information of the route through which the user 91 has moved (the route of from the first searching device 201a to the second searching device 201b in this case) on the basis of the position information stored in the storage means 104.

In concrete, the route information forming means 108 is also allowed to prepare a map that encompasses the first searching device 201a and the second searching device 201b and plot each piece of position information on the map. For example, it is proper to form the route information by plotting each position (latitude, longitude, and altitude) by a mark "•" or the like on the map or connecting the marks "•" with a straight line by the route information forming means 108 (see FIG. 17A).

Moreover, it is possible to express the route information by letter information by the route information forming means 108 like, for example, "Home~Koumachi 4 chome~ox Street~Otsumachi 3 chome~Matsushita department store".

(Step S1615)

The lost article list formed by the lost article specifying means 105 and the route information formed by the route information forming means 108 are notified to the portable telephone or the like of the user 91 by the notification means 106.

As a notification method in this case, the methods corresponding to the methods (1) and (2) described in connection with the first embodiment and so on can be adopted. That is, when notification is given to the portable telephone (position measurement device 60 in the present embodiment) of the user 91 by mail (corresponding to the method (1)), the route information is appropriately notified as letter information as described above in consideration of the display resolution of the portable telephone. That is, the information is obtained by arranging the names of the key points along which the user 91 has passed from the first searching device 201a to the second searching device 201b in the order of pass like "Home~Koumachi 4 chome~ox Street~Otsumachi 3 chome~Matsushita department store".

Figure 17A:
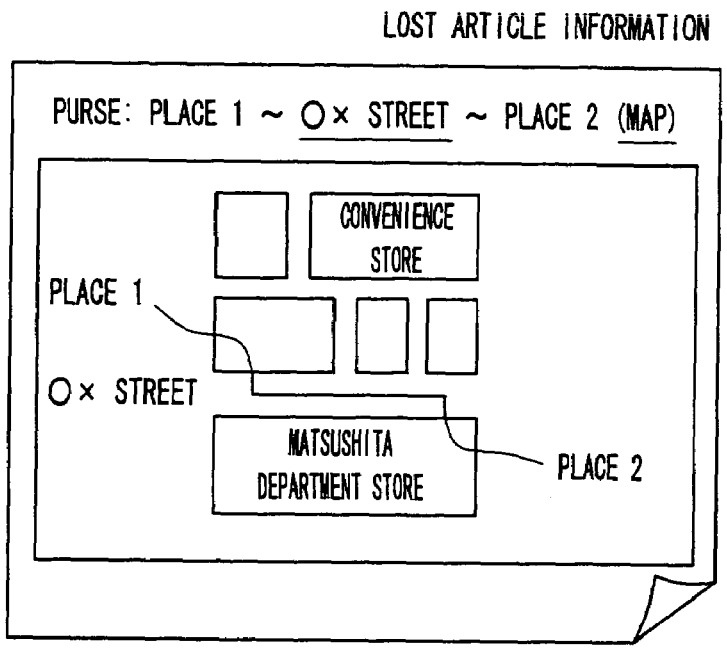
FIG. 17A is an explanatory diagram showing one example of map information.

On the other hand, when notification is made by a Web page uploaded to the Web server 32 (corresponding to the method (2)), the route information may be provided by letter information and is preferably notified as map information as shown in FIG. 17A.

(Step S1616)

Next, it is determined whether or not the searching device by which the user has passed is the first searching device 201a. The processing ends when the answer is YES, or the program flow returns to step S1605 when the answer is NO.

As described above, when the user 91 has lost the belonging 90a, the present system can obtain the information of the place presumed to be the site of loss of the belonging 90a in addition to the information of the lost article 90a. With this arrangement, the search for the lost article 90a can be performed more efficiently and appropriately.

Fifth Embodiment

The article management system of the fifth embodiment is a system in which, when the user 91 has lost the belonging 90a, a mobile search device 70 is requested to search for the lost article 90a to detect the lost article at an early stage.

Figure 18:
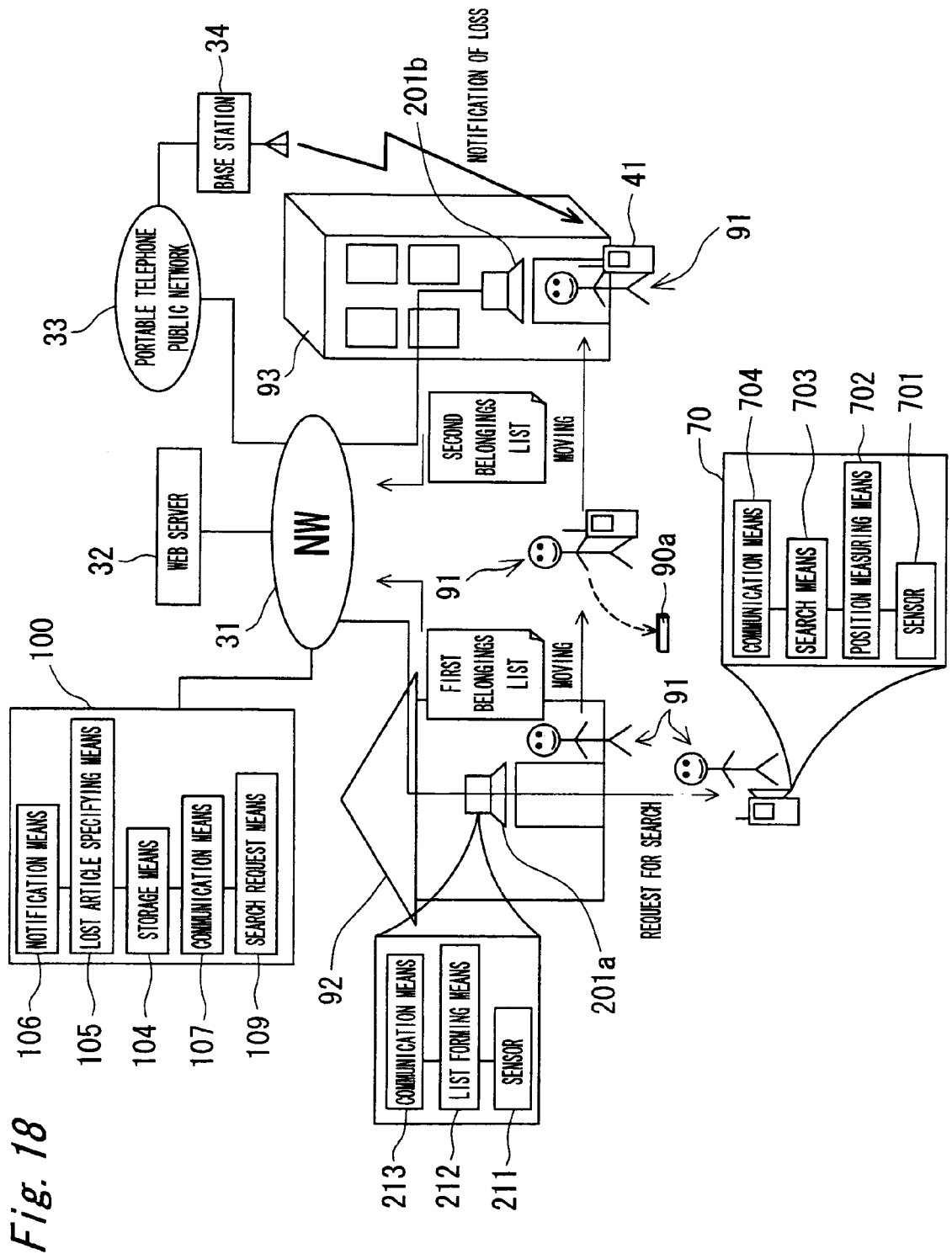
FIG. 18 is a block diagram of an article management system of the fifth embodiment.

FIG. 18 is a block diagram of the article management system of the fifth embodiment. The system of the fifth embodiment has roughly the same construction as that of the system of the first embodiment, and the same constituents are denoted by the same reference numerals with no detailed description provided therefor.

As a point of difference between the system of the fifth embodiment and the system of the first embodiment, there can be enumerated the point that the system of the fifth embodiment is further provided with the mobile search device 70, and the server 100 further has a search request means 109.

When the lost article 90a is specified by the lost article specifying means 105, the search request means 109 executes processing for requesting the mobile search device 70 to search for the lost article 90a.

The mobile search device 70 moves together with a mobile object (including a person, a robot, a vehicle, and so on) and is provided with a sensor 701, a position measuring means 702, a search means 703, and a communication means 704. The mobile search device 70, which moves together with a person, can utilize the portable telephone carried by the person. It is proper to assume the "person" in this case as the user 91 who is receiving the service of the present system. Although only one mobile search device 70 is provided in the example of FIG. 18, actually a plurality of devices exist in the environment.

The sensor 701 reads the information of the identification tag 103 attached to an article similarly to the sensors 211 of the searching devices 201a and 201b installed stationarily at the entrance of the home 92 or the building or store 93.

The position measuring means 702 is a means for measuring the self-position and is able to utilize the GPS system for the self-position measurement.

The communication means 704 is a means for exchanging wireless communications with the searching devices 201. For the wireless communication in this case, for example, a portable telephone, a wireless LAN, or the like can be considered. In the case of the wireless LAN, it is desirable to include the function of the access point of the wireless LAN in the searching device 201. Moreover, the communication means 704 may carry out wireless communications with the access point (hot spot) of the wireless LAN connected to the network 31 even if communications are not exchanged with the searching devices 201. It is essential that the mobile search device 70 is connectable to the network 31.

The search means 703 is a means for searching for an article by the sensor 701 upon receiving a request from the search request means 109 of the server 100 via the network 31.

The operation of the system of the fifth embodiment is described next in accordance with a scene in which the user 91 has lost his or her belonging while moving from the first searching device 201a to the second searching device 201b. The system operates according to the flowchart shown in FIG. 4 or 16 (including the flowchart shown in FIG. 6). When a lost article list is formed by the lost article specifying means 105 and the existence of the lost article is specified (steps S409 and S410 or steps S1612 and S1613), the present system notifies the user 91 of the event and requests the mobile search device 70 to search for the lost article via the searching device 201 by the search request means 109 in step S411 or step S1615.

In concrete, the search request means 109 makes a search request including the article code of the lost article 90a to the mobile search device 70 that exists in the neighborhood of the searching device 201 (the second searching device 201b in this case) where the lost article has been specified and the searching device (the first searching device 201a in this case) by which the user 91 has passed before his or her pass by the lost article-specified searching device 201, via the network 31 and the wireless LAN. In this case, it is proper to define the "neighborhood of the searching device" as the inside of a sphere (two-dimensionally a circle) that is centered at the searching device 201 and has a prescribed radius. With this arrangement, search in an excessive range of area is prevented, and the search is effectively performed.

The search means 703 of the mobile search device 70 that has received the search request makes the sensor 701 execute read of the article code of the lost article 90a included in the search request. When the mobile search device 70 is the portable telephone carried by a person, it is not required to inform the person of the search being performed, and the person is merely required to move carrying the portable telephone in the environment.

When the sensor 701 of the mobile search device 70 can read the article code, or when the lost article 90a is found, the self position is measured by the position measuring means 702, and the measured position and the time when the article code is read are stored as search results into the position measuring means 702. Then, at the searching device 201 by which the person has subsequently passed or the hot spot, the mobile search device 70 transmits the search results to the server 100 via the wireless LAN or the wireless LAN and the network 31 by the communication means 704.

The search results transmitted to the searching device 201 or the hot spot are sent to the server 100 via the network 31, and the server 100 notifies the portable telephone or the like of the user 91 of the search results by the notification means 106. As described above, the search results can be notified to the portable telephone or the like of the user 91 by mail or a Web page as letter information that includes the place where and the time when the lost article 90a has been found or as map information obtained by plotting the place where the lost article has been found on a map.

The search results may be transmitted from the mobile search device 70 directly to the portable telephone or the like of the user 91 by mail. In this case, it is proper to include the mail address of the portable telephone or the like of the user 91 in the identification tag 103 attached to the lost article 90a.

When the travel route information of the user 91 is obtained as in the system of the fourth embodiment, the search request means 109 preferably transmits also the travel route information in making the search request to the mobile search device 70. By so doing, the mobile search device 70 becomes able to perform the search only in the neighborhood of the travel route by comparing the current position measured by the position measuring means 702 with the travel route information. Consequently, a more effective search is achieved.

Furthermore, it is acceptable to set a search time and include the search time in the search request. Then, the mobile search device 70 may end the search after a lapse of the search time upon receiving the search request.

As described above, in the present system, when the user 91 has lost the belonging 90a, the lost article 90a is searched by the mobile search device 70 that is moving in the environment. Consequently, a time until the finding of the lost article 90a can be reduced.

Moreover, since the lost article 90a is searched by the mobile search device 70 that is moving in the environment, the system construction can be further simplified than when a searching device (sensor) that searches for the lost article 90a is stationarily installed.

Sixth Embodiment

The article management system of the sixth embodiment is a system, which determines whether or not the owner of an article is the rightful owner of the article (referred to as person identification (rightful owner determination)) on the basis of the relation between the article and the owner of the article, and in which, when the owner is not the rightful owner, notification is given to the owner of the article. The system is effective particularly when a belonging is stolen.

Figure 19:
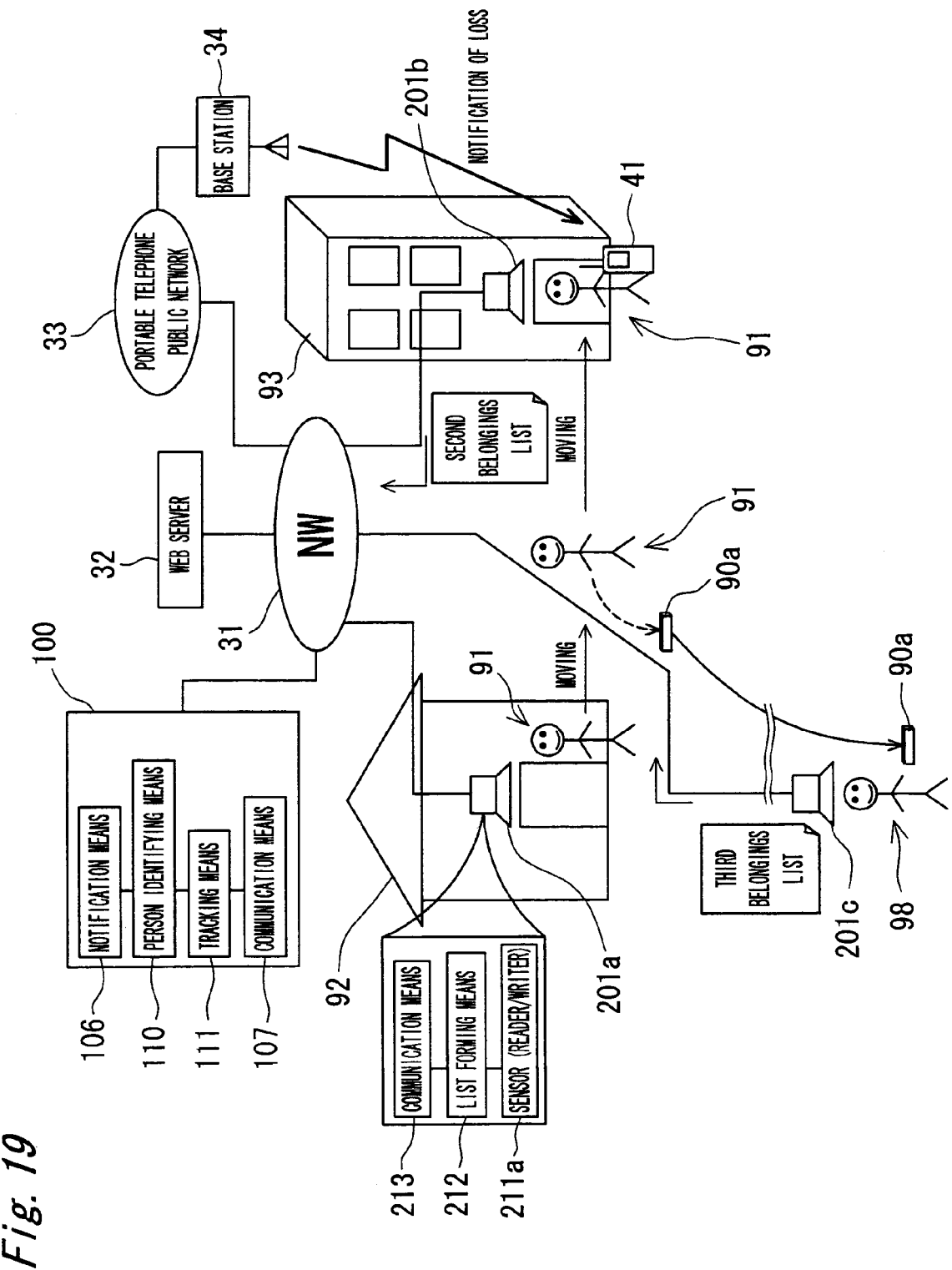
FIG. 19 is a block diagram of an article management system according to a sixth embodiment.

FIG. 19 is a block diagram of the article management system of the sixth embodiment. The system of the sixth embodiment has roughly the same construction as that of the system of the first embodiment, and the same constituents are denoted by the same reference numerals with no detailed description provided therefor.

The system of the sixth embodiment differs from the system of the first embodiment in that the server 100 is provided with a person identifying means 110 and a tracking means 111 in place of the lost article specifying means 105 and the storage means 104.

Moreover, the sensor 211a of the first searching device 201a installed at the entrance of the home 92 of the user 91 serves as a reader/writer that reads the information of the identification tag 103 and writes the information into the identification tag 103, differently from the system of the first embodiment.

Although the present system is constituted by connecting each searching device 201 with the server 100 via the network 31, it is acceptable to make the searching device 201 have the notification means 106, the person identifying means 110 and the tracking means 111 equipped for the server 100 and thereby make one or more searching devices 201 operate in an autonomous distributed manner in the present system.

An article, which is hard to loose, is set as a hard-to-loose article among the belongings of the user 91 in the present system. Then, the hard-to-loose article and the other belongings are associated with each other. When the user 91 (or a third person 98 including a thief) passes by the searching device 201 and a belongings list is formed, person identification is performed depending on whether or not the hard-to-loose article associated with each belonging is included in the list.

The "hard-to-loose article" is, for example, an article that is worn on the user 91 and is normally not lost, and it is possible to concretely set the worn clothes, glasses and so on as the hard-to-loose articles. The hard-to-loose articles may be determined and registered by the user 91 at the time of using the service (at the time of going out) or preparatorily stored as a universal habit into the present system.

It is proper to establish the association between the belongings with the hard-to-loose articles by storing the article codes of the belongings and the codes of the hard-to-loose articles in association into the identification tags 103 attached to the respective belongings when, for example, the user 91 goes out of the home 92 (when the belongings are detected by the first searching device 201a). Differently from the above, it is acceptable to from a table in which the article codes of the belongings and the codes of the hard-to-loose articles are associated with each other and store the table into the storage means of the person identifying means 110 of the server 100. In this case, the sensor 211 of the first searching device 201 need not be served as the reader/writer but allowed to serve as only a reader.

The person identifying means 110 determines whether or not the person who is carrying an article is the rightful owner of the article. When it is determined that the owner of an article is not the rightful owner of the article, a lost article list of the article is formed although the detail will be described later.

When it is determined that the person who is carrying an article is not the rightful owner of the article, the tracking means 111 tracks the movement of the article by the person identifying means 110.

Upon receiving the determination result of the person identifying means 110, the notification means 106 notifies the owner of the article of the determination result. Moreover, the notification means 106 notifies the owner of the article of the position of the article every time the position of the article is detected by the tracking means 111.

Figure 20:
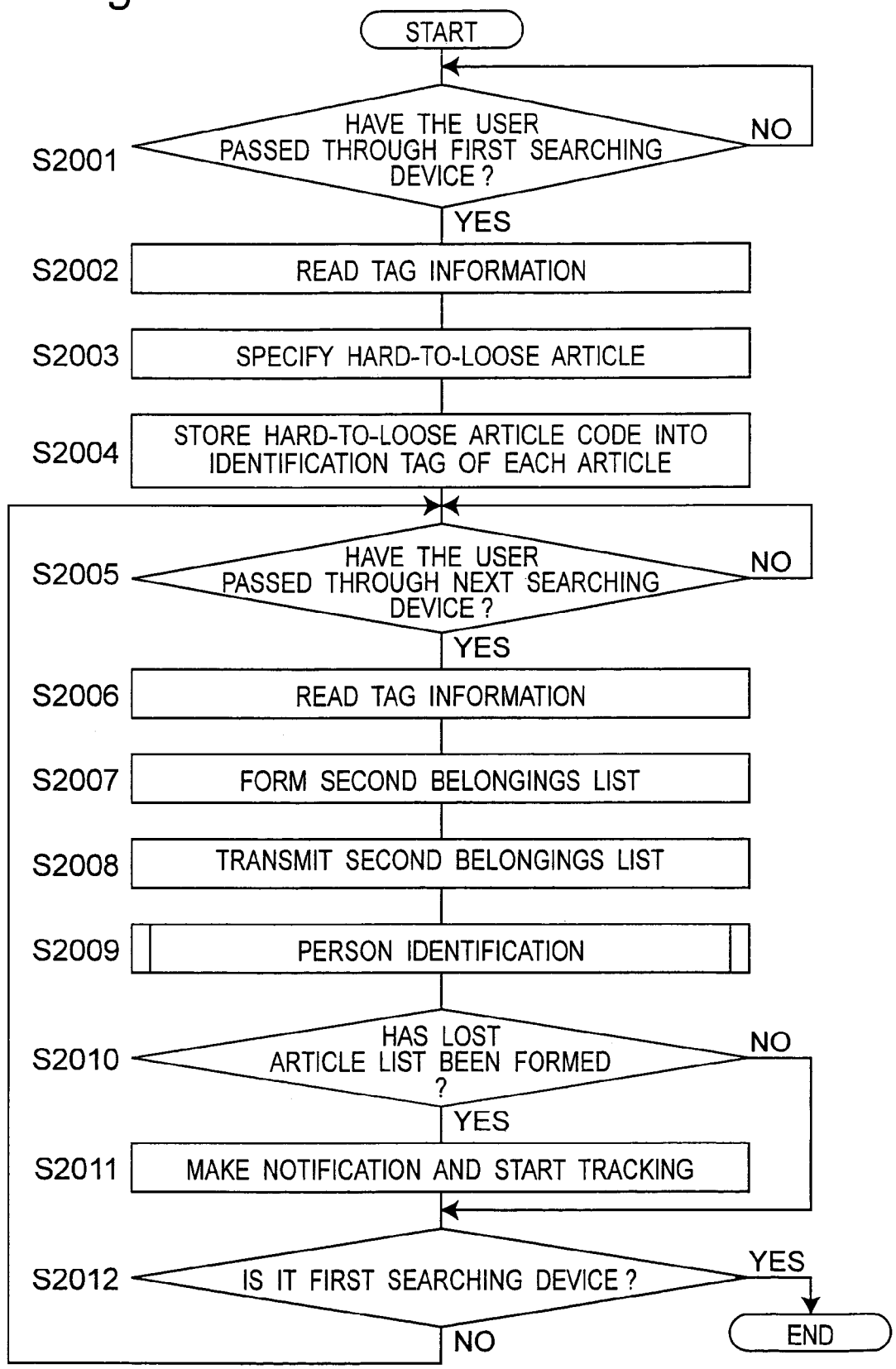
FIG. 20 is a flowchart for explaining the operation of an article management system of the sixth embodiment.

The operation of the article management system of the sixth embodiment is described next with reference to the flowchart shown in FIG. 20. In this case, the operation of the present system is described in accordance with a scene in which the user 91 is robbed of the belonging 90a by the thief 98 while walking in a town and the thief 98 is moving in the town. It is noted that the first searching device 201a is installed at the entrance of the home 92, and the second and third searching devices 201b and 201c are installed at the doorway of a building or store 93 or the like.

(Step S2001)

It is determined whether or not the user 91 has passed by the first searching device 201a. The step S2001 is repeated when the user has not passed, or the program flow proceeds to step S2002 when the user has passed.

(Steps S2002, S2003, and S2004)

The information of the identification tag 103 attached to each article carried by the user 91 is read by the sensor 211 of the first searching device 201a (step S2002), and the hard-to-loose article is specified from among the thus detected belongings (step S2003). Then, the information of the hard-to-loose article is stored into the identification tag 103 of the belongings other than the specified hard-to-loose article (step S2004).

(Step S2005)

It is determined whether or not the user 91 has passed by the next searching device 201 (including the first searching device 201*a*). The step S2005 is repeated when the user 91 has not passed, or the program flow proceeds to step S2006 when the user has passed.

(Steps S2006, S2007, and S2008)

The information of the identification tag 103 attached to each article carried by the user 91 at the time is read by the sensor 211 of the searching device 201 (step S2006), and the list forming means 212 of the searching device 201 forms a belongings list (step S2007). The formed belongings list is transmitted to the server 101 and stored into the storage means of the person identifying means 110 (step S2008).

(Step S2009)

The person identifying means 110 of the server 100 executes the person identifying process of the received belongings list. The process will be described in detail later. When it is determined that the owner of an article is not the rightful owner of the article, a lost article list of the article is formed.

(Steps S2010, S2011, and S2012)

During the person identifying process, it is first determined whether or not the lost article list has been formed. When the list has been formed, the program flow proceeds to step S2011 to notify the portable telephone or the like of the user (owner of the article) 91 of the lost article list by the notification means 106 and start tracking the article by the tracking means 111 (the detail of the tracking will be described later). It is proper to give notification to the portable telephone or the like of the user 91 on the basis of the user code corresponding to the lost article (stolen article). When no lost article list has been formed, the program flow proceeds to step S2012 to determine whether or not the searching device by which the user has passed is the first searching device 201*a* (in other words, whether or not the user 91 has returned his or her home). The processing ends when the answer is YES, or the program flow returns to step S2005 when the answer is NO.

Figure 21:
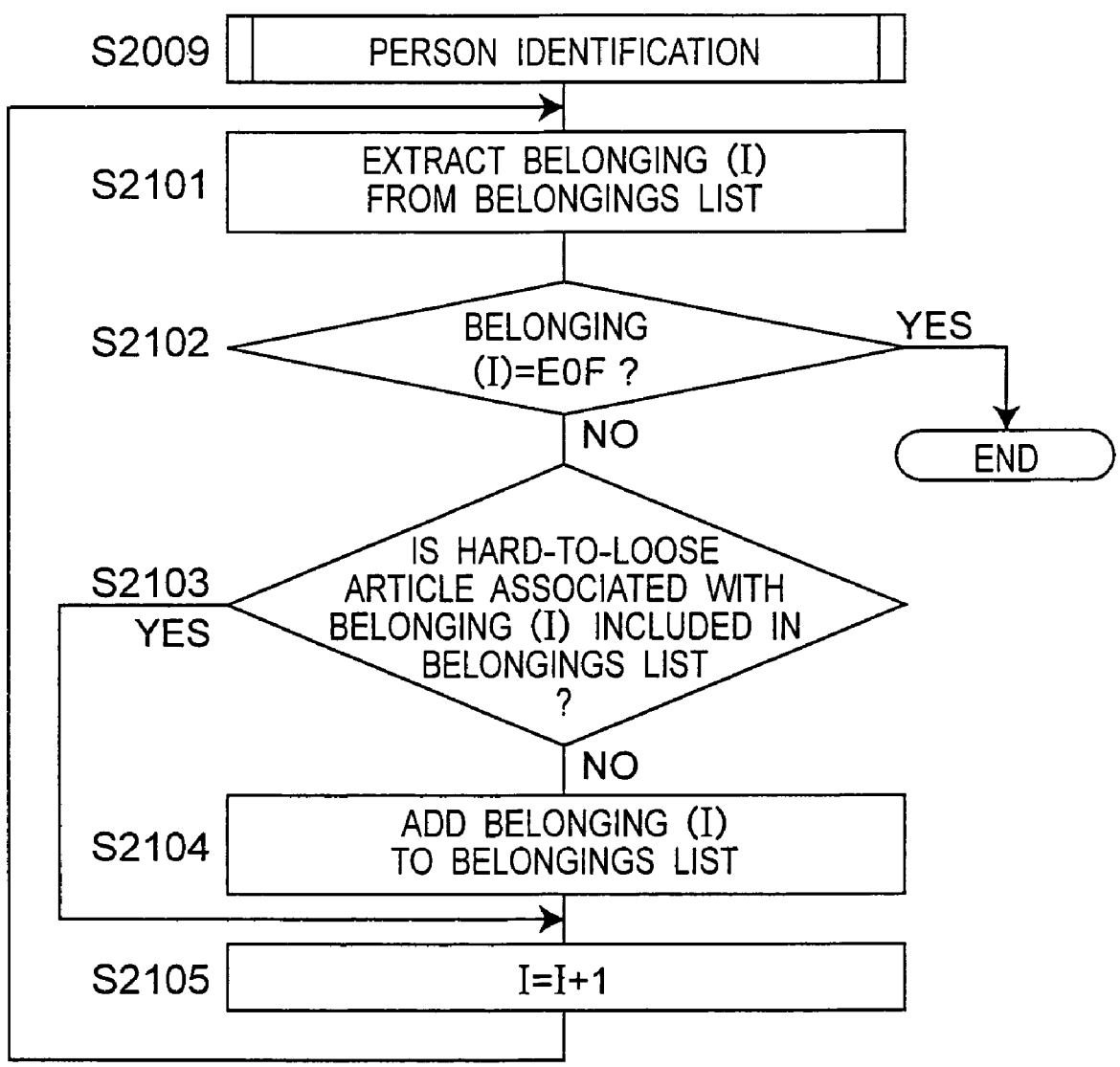
FIG. 21 is a flowchart of a person identification process.

The person identifying process (step S2009) by the person identifying means 110 is described next with reference to the flowchart of FIG. 21.

(Steps S2101 and S2102)

A belonging (I) is extracted from the belongings list (step S2101). It is determined whether or not the extracted article is EOF. The processing ends when the answer is YES, or the program flow proceeds to step S2103 when the answer is NO (step S2102).

(Step S2103)

It is determined whether or not the hard-to-loose article associated with the belonging (I) is included in the belongings list (step S2103). The program flow proceeds to step S2105 when the article is included, or the program flow proceeds to step S2104 when the article is not included.

(Step S2104)

When the hard-to-loose article associated with the belonging (I) is not included in the belongings list, the belonging (I) is added to the lost article list.

(Step S2105)

The article number (I) is incremented by one, and the program flow returns to step S2101.

The article included in the lost article list does not exist together with the hard-to-loose article associated with the article. Therefore, it is presumed that a person different from the owner of the article is carrying the article.

If the lost article list is thus formed through the person identifying process, then the lost article list is transmitted to the tracking means 111, and the tracking of the lost article (stolen article) by the tracking means 111 is started.

Figure 17B:
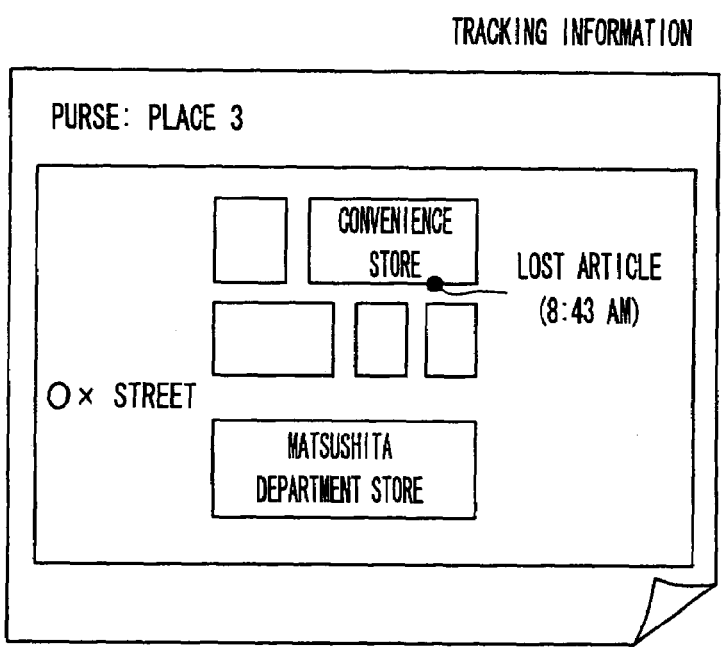
FIG. 17B is an explanatory diagram showing one example of map information.

In concrete, the tracking means 111 compares the stolen article included in the lost article list with the belongings list (the belongings lists of the retrieval target user (e.g., all the users)) sent every moment to the server 100. When the belongings list in which the stolen article is included exists, the position information and time information of the searching device 201 where the belongings list has been formed are obtained, and the portable telephone or the like of the user (owner of the article) 91 is notified of the information via the notification means 106. At this time, it is acceptable to form map information obtained by plotting the position of the searching device 201 where the lost article has been detected as shown in, for example, FIG. 17B and notify the portable telephone or the like of the user 91 of the information.

It is acceptable to provide each searching device 201 with a device of a camera, a microphone, or the like for catching the features of the thief 98. Then, every time the lost article (stolen article) passes by the searching device 201, the image and sound at the time may be recorded. By so doing, the recorded information can be utilized for criminal investigation.

Although the person identifying means 110 determines whether or not the owner of an article is the rightful owner of the article by the hard-to-loose article, the present invention is not limited to this. It is also possible to utilize a certification system using living body information for the person identifying means 110. The certification system is desirably a noncontact certifiable technology of, for example, iris recognition, face recognition, or the like. Otherwise, the user himself or herself may be made to have a tag. It can be considered to, for example, put a tag on the body surface or implant a tag in the body. By comparing the certification result with the user codes of the belongings of the person, the person identification becomes possible.

As described above, according to the present system, the belongings list of the user 91 is formed every time the user 91 who is carrying the article passes by the sensor 211, and it is determined whether or not the user 91 is the rightful owner of the belonging on the basis of the belongings list. Therefore, when the user 91 has robbed of his or her belonging, the information of the stolen article can be obtained at a comparatively early stage.

Moreover, since the stolen article is tracked by the tracking means 111 and the owner of the article is notified of the tracking information, the information can be utilized as a big clue for finding the stolen article and the thief 98.

Other Embodiments

Although the system has the server 100, and the specifying process of the lost article or the like are performed by the server 100 in each of the above embodiments, it is also possible to provide a system in which the terminal of the portable telephone or the like carried by the user 91 has the function of the server 100. In this case, it is desirable to equip both of the searching device 201 and the terminal with a wireless LAN that can be used as a communication means at low cost. According to the system, it is proper to transmit the belongings list formed in each searching device 201 to the terminal carried by the user 91 to store the list there and perform the lost article specifying process or the person identification process at the terminal.

Moreover, it is acceptable to provide a system in which the searching device 201 is made to have the function possessed by the server 100. In the system, the belongings list formed in each searching device 201 is transmitted to the terminal carried by the user 91 to stored the list there, and the belongings list stored in the terminal is transmitted to the searching device 201 when the user 91 passes by the next searching device 201. Then, it is proper for the searching device 201 to specify the lost article as described above on the basis of the newly formed belongings list and the past belongings list transmitted from the terminal and transmit the lost article list to the terminal. Moreover, when performing the person identification, it is proper that each searching device 201 includes the person identifying means 110 and the person identifying process is performed in the searching device 201 every time the user 91 passes by the searching device 201.

As described above, the article management system according to each of the embodiments of the present invention includes the list forming means 212 for forming the list of the belongings carried by the user 91 at the time point on the basis of the information obtained by reading the information that specifies the article carried by the user 91 from the identification tag 103 attached to the article, the storage means 104 for storing the list every time the list is formed by the list forming means 212, the lost article specifying means 105 for specifying the event that the user 91 has lost the article and the lost article on the basis of the two or more lists stored in the storage means 104, and the notification means 106 for notifying the user 91 of the information concerning the lost article by a prescribed notification method upon receiving the event that the lost article has been specified by the lost article specifying means 105.

That is, the article management system according to each of the embodiments of the present invention is not the system that searches for the lost article but the system that specifies the event that the user 91 has lost the article. Therefore, it is proper to install the sensor 211 for reading the information of the identification tag 103 in a specified place by which the user 91 passes. Therefore, the construction of the whole system including the article management system of each of the embodiments of the present invention is simplified.

Moreover, when the lost article is specified by the lost article specifying means 105, the user 91 is notified of the information concerning the lost article, and this therefore eliminates the possibility of the occurrence of a situation in which the user 91 does not perceive the event that the user has lost his or her belonging, for a long time.

Furthermore, the user 91 is notified of the position information of the sensor 211 (searching device 201) that has read the information of the identification tag 103 as the information concerning the article, and therefore, the user 91 can specify an approximate place where the user has lost the article.

The lost article specifying means 105 is allowed to extract the list, which has been formed in the past before the prescribed time (the time point that serves as a reference and includes the present time point and the past time point) and formed immediately precedingly including each of the articles included in the list formed at the prescribed time, to specify a group of articles constituted of the union of all the articles included in the extracted list and, when an article other than the articles included in the list formed at the prescribed time point is included in the specified group of articles, to specify the article as the article that the user 91 has lost.

With this arrangement, it becomes possible to accurately specify the event that the user 91 has lost an article and the lost article. Moreover, it becomes possible to specify the event that the user 91 has lost an article and the lost article also when the list formed about the person (thief 98, finder or the like) who is carrying the lost article is subjected to the processing by the lost article specifying means 105.

The system may further include a route specifying means (the position measuring means 601 and the route information forming means 108) for specifying the route through which the user 91 has moved, and the notification means 106 may notify the terminal of the portable telephone or the like of the user 91 of the travel route of the user 91 specified by the route specifying means together with the information concerning the lost article.

This allows the user 91 to more easily find the lost article on the basis of the information of the travel route.

The system may further include a mobile search means 70 for searching for the article to which the identification tag 103 is attached by moving with the mobile object in the environment, and a search request means 109 for requesting the mobile search means 70 to search for the lost article upon receiving the event that the lost article has been specified by the lost article specifying means 105.

In this case, the notification means 106 may receive the search results of the mobile search means 70 and notify the user 91 of the search results.

By this operation, the lost article is searched by the mobile search means 70, and therefore, it can be expected the lost article is found at an early stage. Moreover, the user 91, who has lost his or her belonging, can save labor for searching for the lost article. Moreover, since the mobile search means 70 moves in the environment, the system construction is simplified than when the search means is stationarily installed in the environment.

Moreover, when the travel route of the user 91 is specified by the route specifying means, the search request means 109 may offer the travel route information specified by the route specifying means to the mobile search means 70 when making a request for searching for the lost article.

In this case, the mobile search means 70 is required to search for the lost article in the neighborhood of the travel route. This allows the search for the lost article to be performed more efficiently.

The article management system according to another embodiment of the present invention has a list forming means 212 for forming the list of the articles on the basis of the information obtained by reading, by the sensor, the information of the owner of the articles carried by the user 91 from the identification tags attached to the articles, the person identifying means 110 for determining whether or not the user 91 is the rightful owner of the article carried by the user 91 on the basis of the list formed by the list forming means 212, and the notification means 106 for notifying the owner of the article of the information concerning the article by a prescribed notification method upon receiving the event that the user 91 is not the rightful owner of the article carried by the user by the person identifying means 110.

The system is also not the system that searches for the lost article but the system that specifies the event that the user 91 has lost the article, and therefore, it is proper to install the sensor 211 in the specified place by which the user 91 passes. Therefore, the construction of the whole system including the article management system of the embodiment of the present invention is simplified.

Moreover, when it is determined that the person who is carrying the article is not the rightful owner by the person identifying means 110, the owner of the article is notified of the information concerning the article. This therefore eliminated the possibility of the occurrence of a situation in which the user (owner of the article) 91 does not perceive the event that his or her belonging has been lost (stolen), for a long time.

It is acceptable to set one of the articles carried by the user 91 as the hard-to-loose article, make the identification tag 103 attached to each of the articles carried by the user 91 include the information of the hard-to-loose article, make the person identifying means 110 determine that the user 91 is the rightful owner of the article when the hard-to-loose article associated with the article included in the list is included in the list, and determine that the user is not the rightful owner of the article when the hard-to-loose article associated with the article is not included in the list, on the basis of the information of the identification tag 103.

This allows the person identification to be accurately executed with a simple system.

The system may further include a tracking means 111 for tracking an article upon determining that the user 91 is not the rightful owner of the article by the person identifying means 110. The tracking means 111 may track the article by investigating whether or not the article is included in the list formed about the user 91 to be tracked, and the notification means 106 may notify the owner of the article of the tracking result of the tracking means 111.

By this operation, when the thief 98 who has stolen the article is moving or when the finder who has picked up the lost article is moving while carrying the article, the user 91 can be successively notified of the movement of the lost article. As a result, the user 91 can obtain a clue for finding the lost article.

The identification tag 103 attached to the article may include the contact address information of the facility related to the article, and the notification means 106 may notify the facility related to the article of the information concerning the article by a prescribed notification method on the basis of the information of the identification tag 103.

With this arrangement, when, for example, the credit card, the cash card, or the like has been lost, the facility related to the card is notified of the event that the card has been lost. Therefore, even before the user perceives the lost article or before the user 91 perceives the lost article and makes contact with the server 35 of the related organization, the abuse of the card or the like is prevented in advance, and high security can be assured.

The article management method of the embodiment of the present invention includes a reading step (steps S402, S406, etc.) for reading the information for specifying the article carried by the user from the identification tag 103 attached to the article, a forming step (steps S403, S407, etc.) for forming a list of the articles carried by the user at the time point on the basis of the information read in the reading step, a storing step (steps S404, S408, etc.) for storing the list every time the list is formed in the forming step, a specifying step (step S409 etc.) for specifying the event that the user has lost the article and the lost article on the basis of the list stored in the storing step, and a notifying step (step S411 etc.) for notifying the user 91 of the information concerning the lost article by a prescribed notification method when the lost article is specified in the specifying step.

Moreover, the article management method of another embodiment of the present invention includes a reading step (step S2006) for reading the information concerning the owner of the article from the identification tag 103 attached to each article carried by the user 91, a forming step (step S2007) for forming a list of the articles carried by the user 91 at the time point on the basis of the information read in the reading step, a person identifying step (step S2009) for determining whether or not the user is the rightful owner of the article on the basis of the list formed in the forming step, and a notifying step (step S2011) for notifying the owner of the article of the information concerning the article by a prescribed notification method when it is determined that user is not the rightful owner of the article in the person identifying step.

By properly combining arbitrary embodiments of the aforementioned various embodiments, the effects owned by each of them can be made effectual.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

As described above, the present invention is able to specify the event that the user has lost his or her belonging due to loss or theft with a simple system and further notify the user of the loss of the belonging and the information concerning the lost article at an early stage. Therefore, the system is useful as a system for retrieving an article or the like by being applied to a variety of environments including, for example, the inside of a town, buildings and facilities such as stores, and so on, and the means of transportation of taxi, bus, and so on.

What is claimed is:

1. An article management system comprising:
    a list forming means for forming a list of an article carried by a user on a basis of information obtained by reading information that specifies the article by means of a sensor from an identification tag attached to the article;
    a storage means for storing the list every time the list is formed by the list forming means;
    a lost article specifying means for specifying an event that the user has lost the article and the lost article on a basis of two or more lists stored in the storage means; and
    a notification means for giving notification of information concerning the lost article upon receiving an event that the lost article is specified by the lost article specifying means, wherein
    the lost article is a credit card or cash card,
    an identification tag attached to the lost credit card or cash card includes contact address information of a server of a credit card company related to the lost credit card or cash card, and
    the notification means notifies the server of the credit card company of information of the lost credit card or cash card on a basis of the information of the identification tag.

2. The article management system as claimed in claim 1, wherein
    the identification tag further includes information of communication content indicating temporary suspension or suspension of the credit card or cash card,
    in order to perform a process of the temporary suspension or the suspension of an ATM of the lost credit card or cash card by the server of the credit card company, the notification means notifies the ATM of the communication content.

3. The article management system as claimed in claim 1, further comprising:
a mobile search means for searching for the article to which the identification tag is attached by moving with a moving object in an environment; and
a search request means for requesting the mobile search means to search for the lost article upon receiving an event that the lost article has been specified by the lost article specifying means.

4. The article management system as claimed in claim 3, wherein
the notification means notifies the user of a search result upon receiving the search result of the mobile search means.

5. An article management system comprising:
a list forming means for forming a list of an article carried by a user on a basis of information obtained by reading information that specifies the article by means of a sensor from an identification tag attached to the article;
a storage means for storing the list every time the list is formed by the list forming means;
a lost article specifying means for specifying an event that the user has lost the article and the lest article on a basis of two or more lists stored in the storage means; and
a notification means for giving notification of information concerning the lost article upon receiving an event that the lost article is specified by the lost article specifying means, wherein
the lost article specifying means functions
to extract lists of articles including each article in the list formed at a specified time point and being formed immediately precedent to the specified time point,
to specify an article group comprised of a union of all articles included in the extracted lists, and
when an article other than the articles included in the list formed at the specified time point is included in the specified article group, to specify the article as the article that
the user has lost.

6. An article management system comprising:
a list forming means for forming a list of an article carried by a user on a basis of information obtained by reading information that specifies the article by means of a sensor from an identification tag attached to the article;
a storage means for storing the list every time the list is formed by the list forming means;
a lost article specifying means for specifying an event that the user has lost the article and the lost article on a basis of two or more lists stored in the storage means;
a notification means for giving notification of information concerning the lost article upon receiving an event that the lost article is specified by the lost article specifying means; and
a route specifying means for specifying a route through which the user has traveled,
wherein the notification means notifies the user of the travel route of the user specified by the route specifying means together with information of the lost article.

7. An article management system comprising:
a list forming means for forming a list of an article carried by a user on a basis of information obtained by reading information that specifies the article by means of a sensor from an identification tag attached to the article;
a storage means for storing the list every time the list is formed by the list forming means;
a lost article specifying means for specifying an event that the user has lost the article and the lost article on a basis of two or more lists stored in the storage means;
a notification means for giving notification of information concerning the lost article upon receiving an event that the lost article is specified by the lost article specifying means;
a route specifying means for specifying a route through which the user has traveled;
a mobile search means for searching for the article to which the identification tag is attached by moving with a moving object in an environment; and
a search request means for requesting the mobile search means to search for the lost article upon receiving an event that the lost article has been specified by the lost article specifying means,
wherein the notification means notifies the user of the travel route of the user specified by the route specifying means together with information of the lost article, and the search request means offers information of the travel route specified by the route specifying means to the mobile search means when making a request for searching for the lost article.

8. An article management system comprising:
a list forming means for forming a list of an article carried by a user on a basis of information obtained by reading information that specifies the article by means of a sensor from an identification tag attached to the article;
a storage means for storing the list every time the list is formed by the list forming means;
a lost article specifying means for specifying an event that he user has lost the article and the lost article on a basis of two or more lists stored in the storage means;
a notification means for giving notification of information concerning the lost article upon receiving an event that the lost article is specified by the lost article specifying means;
a route specifying means for specifying a route through which the user has traveled;
a mobile search means for searching for the article to which the identification tag is attached by moving with a moving object in an environment; and
a search request means for requesting the mobile search means to search for the lost article upon receiving an event that the lost article has been specified by the lost article specifying means, wherein
the notification means notifies the user of the travel route of the user specified by the route specifying means together with information of the lost article, and the search request means offers information of the travel route specified by the route specifying means to the mobile search means when making a request for searching for the lost article,
the mobile search means executes search for the lost article in neighborhood of the travel route offered from the search request means, and
the notification means notifies the user of a search result upon receiving the search result of the mobile search means.

9. An article management system comprising:
a list forming means for forming a list of an article carried by a user on a basis of information obtained by reading information concerning an owner of the article by means of a sensor from an identification tag attached to the article;

a person identifying means for determining whether or not the user is a rightful owner of the article carried by the user on a basis of the list formed by the list forming means; and a notification means for notifying the owner of the article of information concerning the article upon determining that the user is not the rightful owner of the article by the person identifying means.

10. The article management system as claimed in claim 9, wherein one of the articles carried by the user is set as a hard-to-lose article, the identification tag attached to each of the articles carried by the user includes information of the hard-to-lose article, and the person identifying means determines that the user is the rightful owner of the article when the hard-to-lose article associated with the article included in the list is included in the list and determines that the user is not the rightful owner of the article when the hard-to-lose article associated with the article is not included in the list on a basis of the information of the identification tag.

11. The article management system as claimed in claim 9, further comprising a tracking means for tracking an article upon determining that the user is not the rightful owner of the article by the person identifying means, wherein the tracking means tracks the article by investigating whether or not the article is included in the list formed about a target user to be tracked, and the notification means notifies the owner of the article of a tracking result of the tracking means.

12. An article management system comprising:

a list forming means for forming a list of an article carried by a user on a basis of information obtained by reading information that specifies the article by means of a sensor from an identification tag attached to the article;

a storage means for storing the list every time the list is formed by the list forming means;

a lost article specifying means for specifying an event that the user has lost the article and the lost article on a basis of two or more lists stored in the storage mans; and a notification means for giving notification of information concerning the lost article upon receiving an event that the lost article is specified by the lost article specifying means, wherein the identification tag attached to the article includes contact address information of a facility related to the article, and the notification means notifies the facility related to the article of information of the article on a basis of information of the identification tag.

13. An article management method comprising:

reading information that specifies each of a plurality of articles carried by a user from identification tags attached to the articles;

forming a list of the articles carried by the user at a time point on a basis of the read information;

storing the list every time the list is formed;

specifying an event that the user has lost an article and the lost article on a basis of the stored list; and notifying the user of information of the lost article when the lost article is specified.

14. An article management method comprising:

reading information concerning an owner of each of articles carried by a user from identification tags attached to the articles;

forming a list of the articles carried by the user at a time point on a basis of the read information;

determining whether or not the user is a rightful owner of the articles carried by the user on a basis of the formed list; and notifying the owner of the articles of information of the articles when it is determined that the user is not the rightful owner of the articles in person identification.

15. An article management program on a compuer readable medium for making a computer produce:

a function to form a list of articles carried by a user at a time point on a basis of information obtained by reading information concerning an owner of each of the articles from identification tags attached to the articles carried by the user;

a function to determine whether or not the user is a rightful owner of the articles carried by the user on a basis of the formed list; and a function to notify the owner of the articles of information concerning the articles when it is determined that the user is not the rightful owner of the articles in person identification.

16. An article management program on a computer readable medium for making a computer produce;

a function to form a list of articles carried by a user at a time point on a basis of contact address information of a server of a credit card company related to a credit card or cash card obtained by reading information concerning an owner of the credit card or the cash card from an identification tag attached to the credit card or cash card in the articles carried by the user;

a function to determine, when the user is an owner of the credit card or cash card in the articles carried by the user on a basis of the formed list, that the user is a rightful owner of the credit card or cash card, and determine, when the user is not an owner of the credit card or cash card in the articles carried by the user on a basis of the formed list, that the user is not a rightful owner of the credit card or cash card; and a function to notify the server of the credit card company of information concerning the lost credit card or cash card when it is determined that the user is not the rightful owner of the credit card or cash card in the articles in the owner determination.

17. The article management system as claimed in claim 1, further comprising a storage means for storing user information of a certain user and other user information, associated with the certain user, of a user different from the certain user, wherein the notification means does not notify the different user when the user of the lost article specified by the lost article specifying means is the different user associated with the certain user stored in the storing means.

* * * * *

UNITED STATES PATENT AND TRADEMARK OFFICE
CERTIFICATE OF CORRECTION

PATENT NO. : 7,176,801 B2 Page 1 of 1
APPLICATION NO. : 11/172034
DATED : February 13, 2007
INVENTOR(S) : Yoshihiko Matsukawa et al.

It is certified that error appears in the above-identified patent and that said Letters Patent is hereby corrected as shown below:

<u>Col. 37</u>

Line 26, Claim 5, "lest" should be -- lost --

<u>Col. 38</u>

Line 34, Claim 8, "he" should be -- the --

<u>Col. 39</u>

Line 42, Claim 12, "mans" should be -- means --

Signed and Sealed this

Fifteenth Day of May, 2007

JON W. DUDAS
*Director of the United States Patent and Trademark Office*